United States Patent
Yamada et al.

(10) Patent No.: US 9,671,681 B2
(45) Date of Patent: *Jun. 6, 2017

(54) IMAGE PROJECTION APPARATUS

(71) Applicant: RICOH COMPANY, LTD., Tokyo (JP)

(72) Inventors: Masamichi Yamada, Kanagawa (JP); Tetsuya Fujioka, Kanagawa (JP); Yasutada Tsukioka, Kanagawa (JP); Naoyuki Ishikawa, Kanagawa (JP); Hideo Kanai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/068,200

(22) Filed: Mar. 11, 2016

(65) Prior Publication Data

US 2016/0195800 A1 Jul. 7, 2016

Related U.S. Application Data

(63) Continuation of application No. 14/663,287, filed on Mar. 19, 2015, now Pat. No. 9,329,463, which is a
(Continued)

(30) Foreign Application Priority Data

Nov. 4, 2011 (JP) .................. 2011-242924

(51) Int. Cl.
*G03B 21/16* (2006.01)
*G03B 21/14* (2006.01)
(Continued)

(52) U.S. Cl.
CPC ............. *G03B 21/16* (2013.01); *G03B 21/14* (2013.01); *G03B 21/145* (2013.01);
(Continued)

(58) Field of Classification Search
CPC ........ G03B 21/16; G03B 21/00; G03B 21/14; H04N 9/3105; H04N 9/3144; H04N 9/3197
See application file for complete search history.

(56) References Cited

U.S. PATENT DOCUMENTS 6,224,216 B1  5/2001  Parker et al.
6,568,813 B1  5/2003  Haba et al.
(Continued)

FOREIGN PATENT DOCUMENTS

CN    1705910 A    12/2005
CN    1717028      1/2006
(Continued)

OTHER PUBLICATIONS

U.S. Notice of Allowance dated Nov. 13, 2015 for U.S. Appl. No. 14/659,261.
(Continued)

*Primary Examiner* — Sultan Chowdhury
(74) *Attorney, Agent, or Firm* — Oblon, McClelland, Maier & Neustadt, L.L.P.

(57) ABSTRACT

An image projection apparatus includes a light source, light from which is used to form an image to be projected, a first flow path, a control unit configured to control a light emission from the light source, an electrical power stabilizing unit configured to stabilize an electrical power to be supplied to the light source, and an electrical power source unit configured to supply the electrical power to at least one of the control unit and the electrical power stabilizing unit. One or both of the electrical power source unit and the electrical power stabilizing unit is/are divided into a plurality of boards. The light source is arranged on a normal line of a surface of any of the plurality of boards. The plurality
(Continued)

of boards configure surfaces of the first flow path except a surface nearest to the light source.

10 Claims, 30 Drawing Sheets

Related U.S. Application Data continuation of application No. 14/454,416, filed on Aug. 7, 2014, now Pat. No. 9,075,297, which is a continuation of application No. 13/660,289, filed on Oct. 25, 2012, now Pat. No. 9,091,908.

(51) Int. Cl.
    *H04N 9/31*     (2006.01)
    *G03B 21/28*     (2006.01)
    *G03B 21/20*     (2006.01)

(52) U.S. Cl.
    CPC ............ *G03B 21/206* (2013.01); *G03B 21/28* (2013.01); *H04N 9/3144* (2013.01)

(56) References Cited

U.S. PATENT DOCUMENTS

| | | |
|---|---|---|
| 6,582,082 B2 | 6/2003 | Tiao et al. |
| 6,979,960 B2 | 12/2005 | Okawa et al. |
| 7,061,699 B2 | 6/2006 | Watanabe et al. |
| 7,275,833 B2 | 10/2007 | Saito |
| 7,976,171 B2 | 7/2011 | Kameoka |
| 9,004,697 B2 | 4/2015 | Fujioka et al. |
| 9,010,940 B2 | 4/2015 | Fujioka et al. |
| 2002/0001065 A1 | 1/2002 | Takizawa et al. |
| 2002/0071061 A1 | 6/2002 | Ito et al. |
| 2004/0125343 A1 | 7/2004 | Hara et al. |
| 2004/0156117 A1 | 8/2004 | Takaura et al. |
| 2004/0218151 A1 | 11/2004 | Ito et al. |
| 2005/0052622 A1 | 3/2005 | Morishita |
| 2005/0213050 A1 | 9/2005 | Suzuki |
| 2006/0001840 A1 | 1/2006 | Kurihara |
| 2006/0170876 A1 | 8/2006 | Takemi et al. |
| 2007/0236668 A1 | 10/2007 | Suzuki |
| 2007/0285623 A1 | 12/2007 | Kuraie |
| 2007/0291238 A1 | 12/2007 | Yanagisawa et al. |
| 2008/0111974 A1 | 5/2008 | Plut |
| 2008/0252859 A1 | 10/2008 | Nagahata et al. |
| 2009/0021703 A1 | 1/2009 | Takaura et al. |
| 2009/0040468 A1 | 2/2009 | Kameoka et al. |
| 2009/0051881 A1 | 2/2009 | Noda |
| 2010/0128184 A1 | 5/2010 | Moriwaki et al. |
| 2011/0181845 A1* | 7/2011 | Nakashita .............. G03B 21/16 353/58 |
| 2011/0188004 A1 | 8/2011 | Maeda et al. |
| 2011/0188008 A1 | 8/2011 | Maeda et al. |
| 2012/0013856 A1 | 1/2012 | Yasuda |
| 2013/0114045 A1 | 5/2013 | Fujioka et al. |
| 2013/0114274 A1 | 5/2013 | Fujioka et al. |
| 2013/0128234 A1 | 5/2013 | Fujioka et al. |
| 2013/0242271 A1* | 9/2013 | Jougo .................... G03B 21/16 353/61 |
| 2015/0002828 A1 | 1/2015 | Yamada et al. |
| 2015/0015851 A1 | 1/2015 | Yamada et al. |
| 2015/0185595 A1 | 7/2015 | Fujioka et al. |
| 2015/0192842 A1 | 7/2015 | Fujioka et al. |
| 2015/0192843 A1 | 7/2015 | Yamada et al. |

FOREIGN PATENT DOCUMENTS

| | | |
|---|---|---|
| CN | 101140411 A | 3/2008 |
| CN | 201995064 | 9/2011 |
| JP | 2002-174857 | 6/2002 |
| JP | 2003-207849 | 7/2003 |
| JP | 2006-084926 | 3/2006 |
| JP | 2006-84990 A | 3/2006 |
| JP | 2007-078924 | 3/2007 |
| JP | 2007-171390 | 7/2007 |
| JP | 2008-102372 | 5/2008 |
| JP | 2008-209464 | 9/2008 |
| JP | 2009-071489 | 4/2009 |
| JP | 4314552 | 5/2009 |
| JP | 3348691 | 9/2009 |
| JP | 2010-26522 A | 2/2010 |
| JP | 2010-210985 | 9/2010 |
| JP | 2011-158523 | 8/2011 |
| TW | 200414102 A | 8/2004 |
| WO | WO 2008/102832 | 8/2008 |

OTHER PUBLICATIONS

U.S. Office Action dated Jun. 30, 2015 for U.S. Appl. No. 14/659,261.
Extended European Search Report issued in European Patent Application No. 12190952.7 on Mar. 18, 2015 in English.
Notice of Allowance dated Nov. 5, 2014 for U.S. Appl. No. 13/660,289.
Japanese Office Action dated Nov. 14, 2014 for Japanese Patent Application No. 2014-187315.
Chinese Office Action dated Sep. 3, 2014 for Chinese Application No. 201210597227.X with English translation thereof.
Japanese Office Action mailed Aug. 22, 2014 for Japanese Patent Application No. 2011-242924.
Japanese Office Action mailed Feb. 14, 2014 for Japanese Patent Application No. 2014-006432.
Japanese Office Action mailed Jun. 6, 2014 for Japanese Patent Application No. 2014-006432.
Combined Chinese Office Action and Search Report issued on Aug. 30, 2016 in Patent Application No. 201510854330.1 (with English translation).

* cited by examiner

FIG.30A
FIG.30B
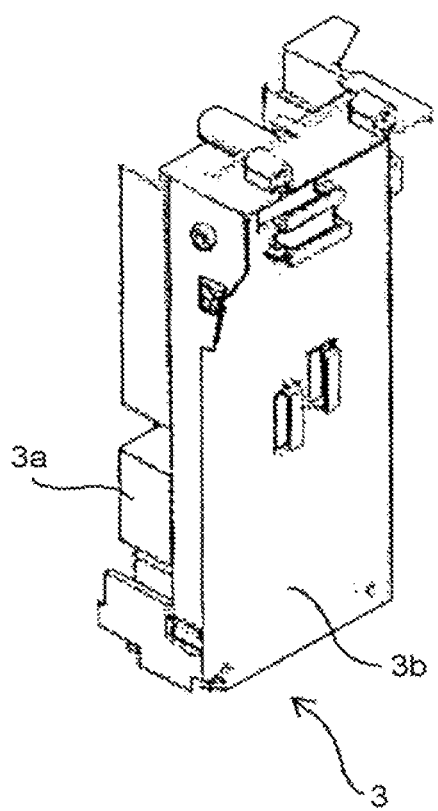
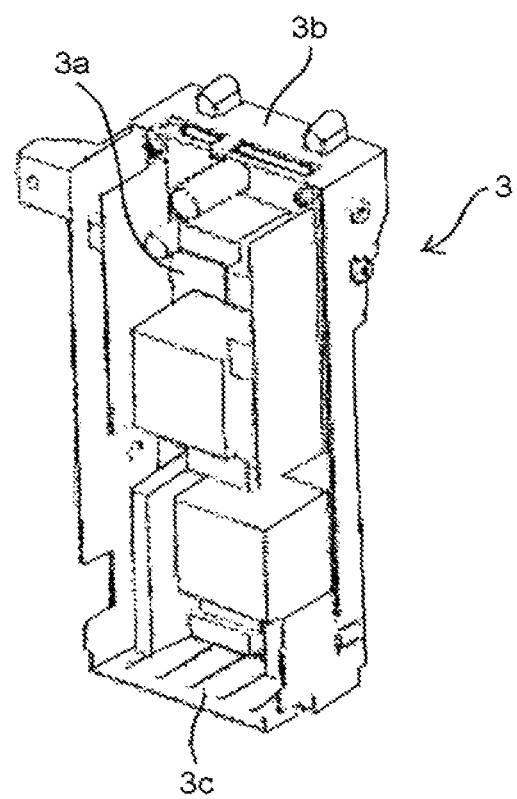

IMAGE PROJECTION APPARATUS

CROSS-REFERENCE TO RELATED APPLICATIONS

The present application is a continuation application of U.S. application Ser. No. 14/663,287, filed Mar. 19, 2015, which is a continuation application of U.S. application Ser. No. 14/454,416 (now U.S. Pat. No. 9,075,297), filed Aug. 7, 2014, which is a continuation application of U.S. application Ser. No. 13/660,289 (now U.S. Pat. No. 8,992,030), filed Oct. 25, 2012, which claims priority to Japanese Patent Application No. 2011-242924 filed in Japan on Nov. 4, 2011. The entire contents of each of the above are incorporated herein by reference.

BACKGROUND OF THE INVENTION

1. Field of the Invention

The present invention relates to an image projection apparatus.

2. Description of the Related Art

Conventionally, there is known an image projection apparatus provided with an image forming part to form an image with light emitted from a light source on the basis of image data from a personal computer (PC), video camera or the like, so that the image is projected and displayed on a screen or the like.

The image projector apparatus is provided with (i) a ballast board as an electrical power stabilizer for supplying stabilized electrical power (electrical current) to the light source with an AC (Alternate Current) voltage corresponding to fluctuation of the light source, and (ii) a PFC (Power Factor Correction) power source board as a power source board for supplying electrical power to a control board as a control unit for controlling the light source and the image forming part. For the electrical power stabilizer and the control unit, the PFC power source board boosts the AC voltage supplied from a power source cable.

The PFC power source board and the ballast board are provided with a great number of electrical elements such as a capacitor, a coil, a resistor and the like. These electrical elements generate heat to raise the temperature of boards. When the temperatures of the PFC power source board and the ballast board rise and become high temperatures, the operation performance and the durability may be lowered.

Japanese Patent Application Laid-open No. 2007-78924 discloses an image projection apparatus for blowing air to the PFC power source board to cool the PFC power source board by air.

However, a great number of electrical elements such as the capacitor, the coil and the resistor are mounted on the PFC power source board, as described above, and thus the area of the board itself is large and it is long in the flowing direction of the air. As a result, the air, which took heat from the PFC power source board on the upstream side and which temperature rose, flows on the downstream side of a flow path of the air that flows on the PFC power source board. A portion that is not sufficiently air-cooled thus may arise on the downstream side of the flow path of the air of the PFC power source board. The wind amount is raised by raising the rotation number of a fan and the like serving as an air blowing unit for blowing air to the PFC power source board or using a large fan so that the air of low temperature can also flow on the downstream side of the flow path of the air of the PFC power source board. However, if the rotation number of the air blowing unit is raised, the wind noise increases, the noise of the apparatus increases, and the power consumption increases.

Furthermore, an area deviated from the flow path of the air of the air blowing unit may arise on the PFC power source board having a large area and a portion that is not air-cooled may arise depending on the size and the arrangement position of the air blowing unit such as a fan. Thus, a large air blowing unit is required and the flow path of the air blown by the air blowing unit needs to be made large, in which case, the apparatus enlarges. Furthermore, the PFC power source board has a large area, as described above, and has a large volume since a great number of electrical elements are mounted thereon. Therefore, the PFC power source board cannot be arranged in an open space after each optical element of the image projection apparatus is arranged, and a space for arranging the PFC power source board needs to be prepared anew. The matters described for the PFC power source board also goes for the ballast board, and are the cause of enlargement of the apparatus.

SUMMARY OF THE INVENTION

It is an object of the present invention to at least partially solve the problems in the conventional technology.

An image projection apparatus includes a light source, light from which is used to form an image to be projected, a first flow path, a control unit configured to control a light emission from the light source, an electrical power stabilizing unit configured to stabilize an electrical power to be supplied to the light source, and an electrical power source unit configured to supply the electrical power to at least one of the control unit and the electrical power stabilizing unit. One or both of the electrical power source unit and the electrical power stabilizing unit is/are divided into a plurality of boards. The light source is arranged on a normal line of a surface of any of the plurality of boards. The plurality of boards configure surfaces of the first flow path except a surface nearest to the light source.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 30A and 30B are perspective views illustrating a ballast board unit;

DETAILED DESCRIPTION OF THE PREFERRED EMBODIMENTS

Figure 1:
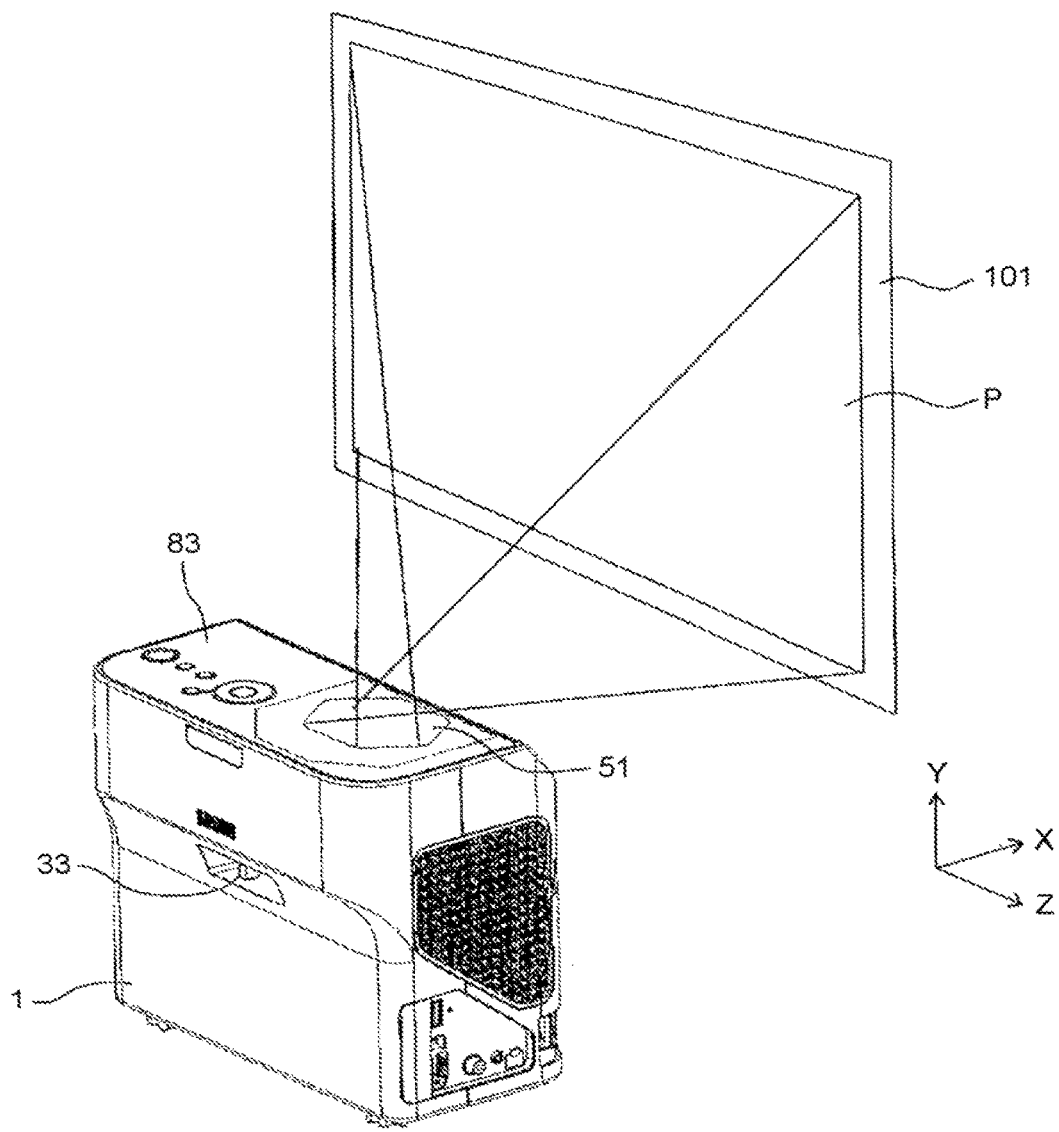
FIG. 1 is a projector and a projection plane according to an embodiment.

Hereinafter, embodiments of a projector as an image projection apparatus according to the present invention will be described with reference to the accompanying drawings. FIG. 1 perspectively illustrates a projector 1 and a projection plane 101 such as a screen according to an embodiment. Incidentally, in the following explanation, a normal line direction of the projection plane 101 is referred to as X direction, a short axis direction (vertical direction) of the projection plane 101 is referred to as Y direction, and a long axis direction (horizontal direction) of the projection plane 101 is referred to as Z direction.

As illustrated in FIG. 1, a transmissive glass 51 from which a projection image P is emitted is disposed at a top surface of the projector 1. The projection image P emitted from the transmissive glass 51 is projected on the projection plane 101 such as a screen.

Furthermore, at the top surface of the projector 1, an operating part 83 by which a user operates the projector 1 is disposed. At a side surface of the projector, a focus lever 33 for a focus adjustment is disposed.

Figure 2:
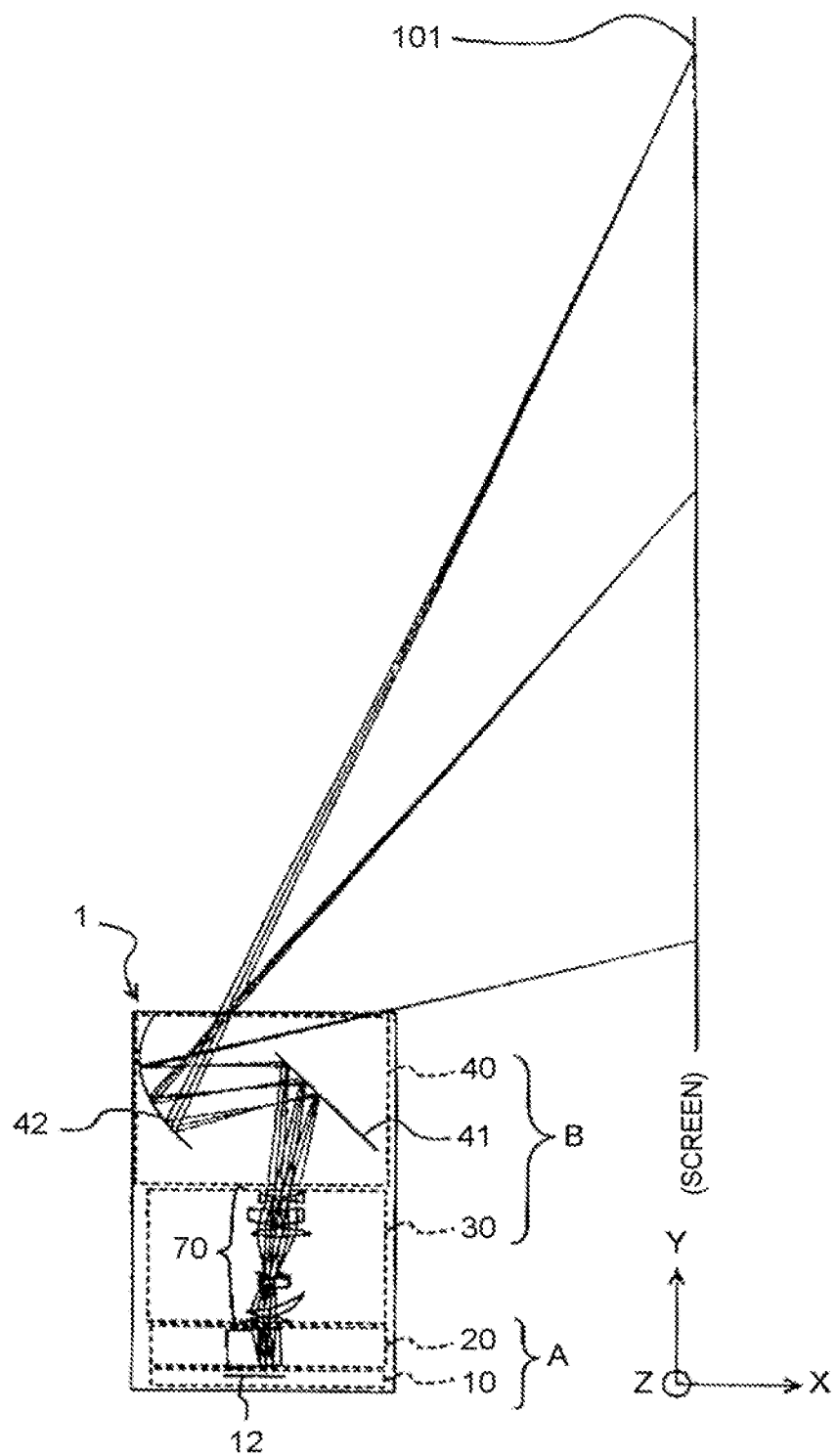
FIG. 2 is a view illustrating light paths from the projector to the projection plane.

FIG. 2 illustrates light paths from the projector 1 to the projection plane 101.

The projector 1 is provided with (i) a light source unit including a light source and (ii) an image forming part A to form an image by using a light from the light source. The image forming part A includes (i) an image forming unit 10 provided with a DMD (Digital Mirror Device) 12 as an image forming element and (ii) a lighting unit 20 for reflecting the light from the light source to the DMD 12 so that an optical image is generated. The projector 1 is also provided with a projection optical system B to project the image on the projection plane 101. The projection optical system B has at least one transmissive refracting optical system and includes (i) a first optical unit 30 provided with a first optical system 70 which is a coaxial optical system having a positive power and (ii) a second optical unit 40 provided with a reflecting mirror 41 and a concave mirror 42 having a positive power.

The DMD 12 is irradiated with the light from the light source by the lighting unit 20. The light irradiated by the lighting unit 20 is modulated to form the image. The optical image formed by the DMD 12 is projected on the projection plane 101 through the first optical system 70 in the first optical unit 30, and the reflecting mirror 41 and the concave mirror 42 in the second optical unit 40.

Figure 3:
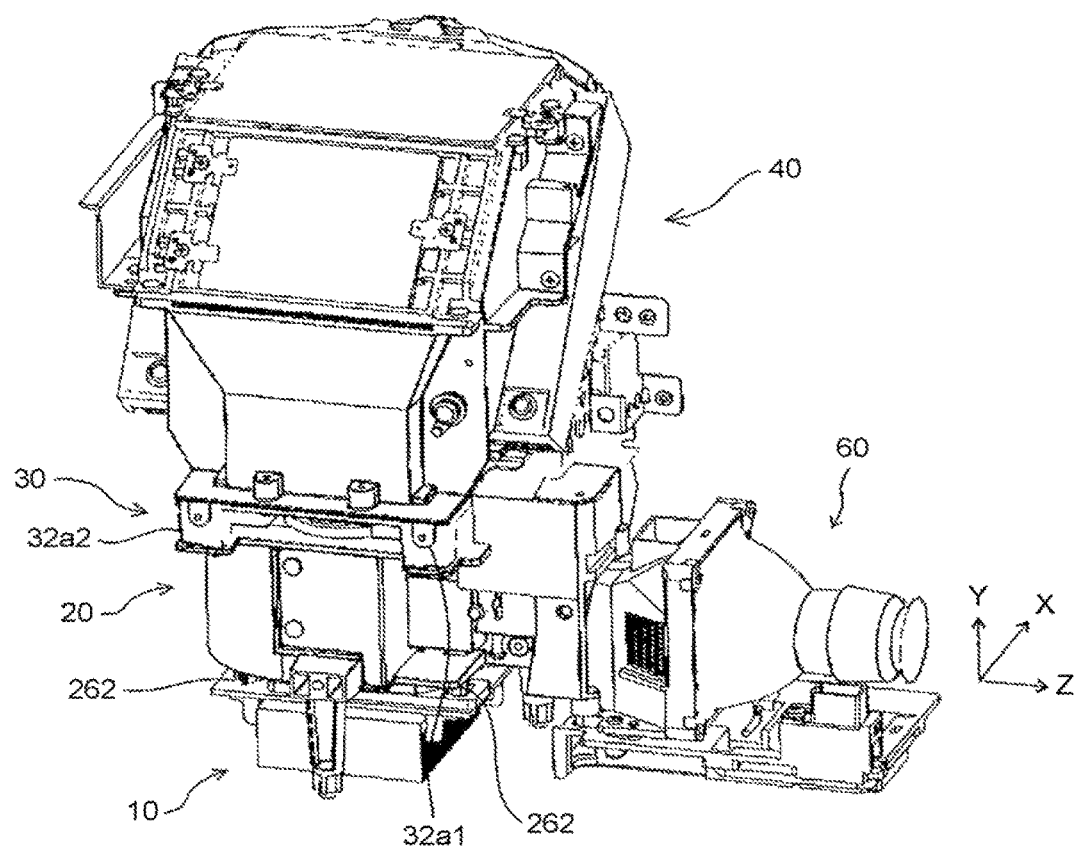
FIG. 3 is a perspective view schematically illustrating an internal structure of the projector.

FIG. 3 schematically and perspectively illustrates an internal structure of the projector 1.

As illustrated in FIG. 3, the image forming unit 10, the lighting unit 20, the first optical unit 30, the second optical unit 40 are aligned in Y direction in the figure among directions parallel to the projection plane and an image plane of the projection image. The light source unit 60 is disposed at a right side in the figure of the lighting unit 20.

Incidentally, in FIG. 3, reference numerals 32a1 and 32a2 refer to legs of a lens holder 32 of the first optical unit 30, and reference numeral 262 refers to a screw clamp portion for screwing (fixing by screw) the image forming unit 10 to the lighting unit 20.

Next, each unit structure will be described.

First, the light source unit 60 will be described.

Figure 4:
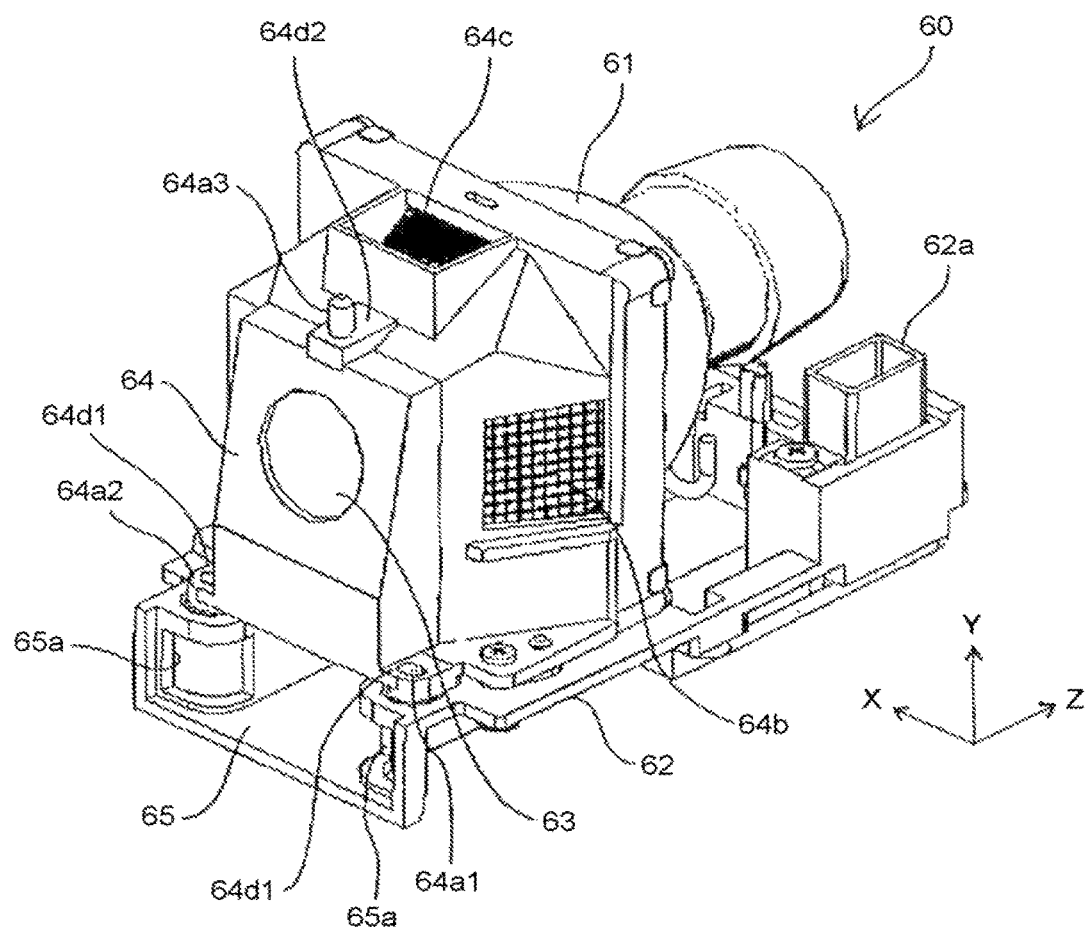
FIG. 4 is a perspective view schematically illustrating a light source unit.

FIG. 4 schematically and perspectively illustrates the light source unit 60.

The light source unit 60 includes a light source bracket 62. A light source 61 such as a halogen lamp, a metal halide lamp and a high pressure mercury lamp is mounted on the light source bracket 62. The light source bracket 62 is provided with a connector portion 62a for connecting with a power source side connector connected to a power source unit 80 (see FIG. 14).

A holder 64, which holds a reflector and the like, is screwed to the upper side of the light source bracket 62 on a light emitting side of the light source 61. The holder 64 has an emitting window 63 at an opposite side to a side where the light source 61 is disposed. The light emitted from the light source 61 is collected to the emitting window 63 by the reflector 67, which is held by the holder 64, and emitted from the emitting window 63.

Light source positioning portions 64a1 to 64a3 are disposed at a top side and at X direction both ends of a bottom side of the holder 64, for positioning the light source unit 60 relative to a lighting bracket 26 (see FIG. 6) of the lighting unit 20. The light source positioning portion 64a3 disposed at the top side of the holder 64 is a protrusion or has a protrusion-like structure. The light source positioning portions 64a1 and 64a2 disposed at both ends of the bottom side of the holder 64 are holes or have hole-like structures.

At a side surface of the holder 64, a light source air inlet 64b is disposed for allowing an incoming flow of the air to cool down the light source 61. At a top surface of the holder 64, a light source air outlet 64c is disposed for allowing an outgoing flow of the air heated by the light source 61.

The light source bracket 62 is provided with an airflow path 65 for allowing an incoming flow of the air taken from an air intake blower (see FIG. 21 and the like) as described later. At the air intake side (front side in the figure) of the airflow path 65, openings 65a are disposed for guiding a part of the airflow flowing into the airflow path 65 to between the light source unit 60 and an access cover 54 (see FIG. 7) which will be described later. The cooling of the light source unit 60 will be described later.

A planar portion 64d2 on which the light source positioning protrusion 64a3 is formed as illustrated in FIG. 4, and planar portions 64d1 provided with the light source positioning holes 64a1 and 64a2 are abutting members for abutting against the lighting bracket when pressed by a pressing member of the access cover, as described later.

Next, the lighting unit 20 will be described.

Figure 5:
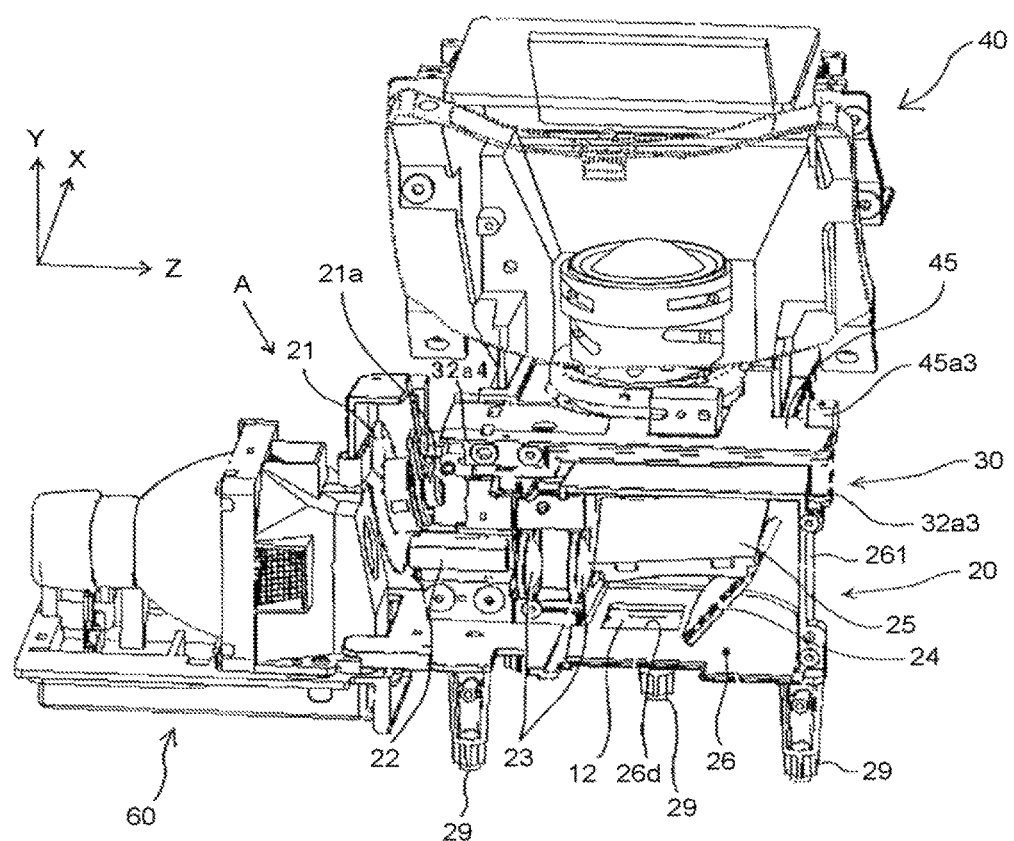
FIG. 5 is a perspective view illustrating optical system components housed in a lighting unit, illustrating with other units.

FIG. 5 perspectively illustrates optical system components housed in the lighting unit 20, while also illustrating other units.

As illustrated in FIG. 5, the lighting unit 20 includes a color wheel 21, a light tunnel 22, two relay lenses 23, a cylinder mirror 24, and a concave mirror 25, which are held by the lighting bracket 26. The lighting bracket 26 has a housing-like portion 261 in which two relay lenses 23, the cylinder mirror 24, and the concave mirror 25 are housed. Among four lateral sides of the housing-like portion 261, only right lateral side in the figure has a wall. Other three lateral sides are opened. At the opening of the lateral side deep in X direction in the figure, an OFF light board 27 (see FIG. 6) is attached. At the opening of the front lateral side in X direction in the figure, a cover component is attached. Thereby, two relay lenses 23, the cylinder mirror 24, and the concave mirror 25, which are housed in the housing-like portion 261 of the lighting bracket 26, are surrounded by the lighting bracket 26, the OFF light board 27 (see FIG. 6), and the cover component.

At a bottom surface of the housing-like portion 261 of the lighting bracket 26, a lighting through hole 26d is formed for exposing the DMD 12.

The lighting bracket 26 has three legs 29. These legs 29 abut on a base component 53 (see FIG. 19) of the projector 1 to support weights of the first optical unit 30 and the second optical unit 40 which are stacked and fixed on the lighting bracket 26. These legs 29 disposed as such form a space for allowing an incoming flow of ambient air toward a heat sink 13 (see FIG. 6) as a cooling unit to cool down the DMD 12 of the image forming unit 10, which will be described later.

Incidentally, in FIG. 5, reference numerals 32a3 and 32a4 refer to legs of the lens holder 32 of the first optical unit 30, and a reference numeral 45a3 refer to a screw fix portion 45a3 of the second optical unit 40.

Figure 6:
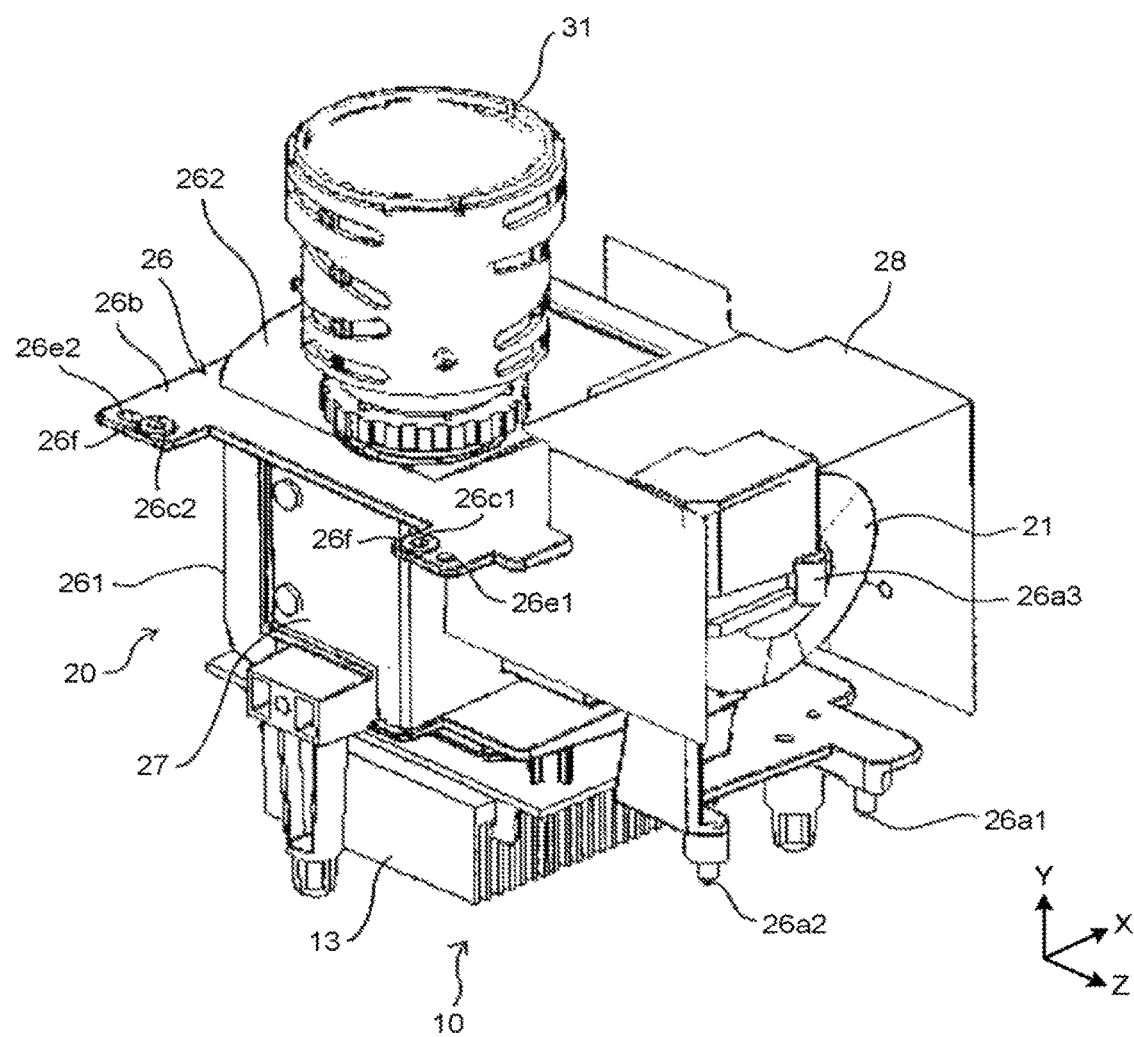
FIG. 6 is a perspective view from a direction indicated by an arrow A in FIG. 5, schematically illustrating the lighting unit, a projection lens unit, and an image forming unit.

FIG. 6 is a perspective view from a direction indicated by an arrow A in FIG. 5 and illustrates the lighting unit 20, the projection lens unit 31, and the image forming unit 10.

At an upper side of the housing-like portion 261 of the lighting bracket 26, an upper plate 26b is disposed orthogonally to Y direction in the figure. At four corner of this upper plate 26b, through holes for letting through screws for screwing the first optical unit 30 are disposed (in FIG. 6, through holes 26c1 and 26c2 are illustrated). Positioning holes 26e1 and 26e2 for positioning the first optical unit 30 to the lighting unit 20 are disposed adjacent to the through holes 26c1 and 26c2 located at the front side in X direction in the figure. Among two positioning holes disposed at the front side in X direction in the figure, the positioning hole 26e1 at a side of which the color wheel 21 is disposed is a main reference for the positioning and has a round hole shape. The positioning hole 26e2 at an opposite side of the color wheel 21 installation side is a sub reference for the positioning, and has an elongate hole extending in Z direction. A periphery of through hole 26c1 and a periphery of through hole 26c2 are protruded from a surface of the upper plate 26b of the lighting bracket 26. These protruded peripheries functions as positioning protrusions 26f for positioning the first optical unit 30 in Y direction. If the positioning accuracy in Y direction should be improved without employing the positioning protrusions 26f, it is required to improve an entire flatness of the upper plate 26b of the lighting bracket 26. This raises the cost. On the other hand, by employing the positioning protrusions 26f, it is enough to improve the flatness of the positioning protrusions 26f only. Thereby, the positioning accuracy in Y direction can be improved, while saving the cost.

A light shielding plate 262 is disposed at the opening of the upper plate 26b of the lighting bracket 26. A lower portion of the projection lens unit 31 engages with the light shielding plate 262, so that the light from the upper side to inside of the housing-like portion 261 is shielded.

A space between the through hole 26c1 and the through hole 26c2 of the lighting bracket 26 is cut off so as not to be an obstacle when the second optical unit 40 is screwed to the first optical unit 30, which will be described later.

At the color wheel side (the front side in Z direction in the figure) of the lighting bracket 26, a cylinder-like light source positioning joint portion 26a3 is disposed. The cylinder-like light source positioning joint portion 26a3 has a vertical through hole into which the protrusion-like light source positioning portion 64a3 (see FIG. 4) formed on the upper surface of the holder 64 of the light source unit 60 fits or engages. Below the light source positioning joint portion 26a3, two protrusion-like light source positioning joint portions 26a1 and 26a2 are disposed, which engage with two hole-like light source positioning portion 64a1 and 64a2 formed on the light source bracket 62 side of the holder 64. By engaging three light source positioning portions 64a1 to 64a3 of the holder 64 with three light source positioning joint portions 26a1 to 26a3 formed on the lightning bracket 26 of the lighting unit 20, the light unit 60 is positioned and fixed to the lighting unit 20 (see FIG. 3).

To the lighting bracket 26, a lighting cover 28 for covering the color wheel 21 and the light tunnel 22 is attached.

Figure 7:
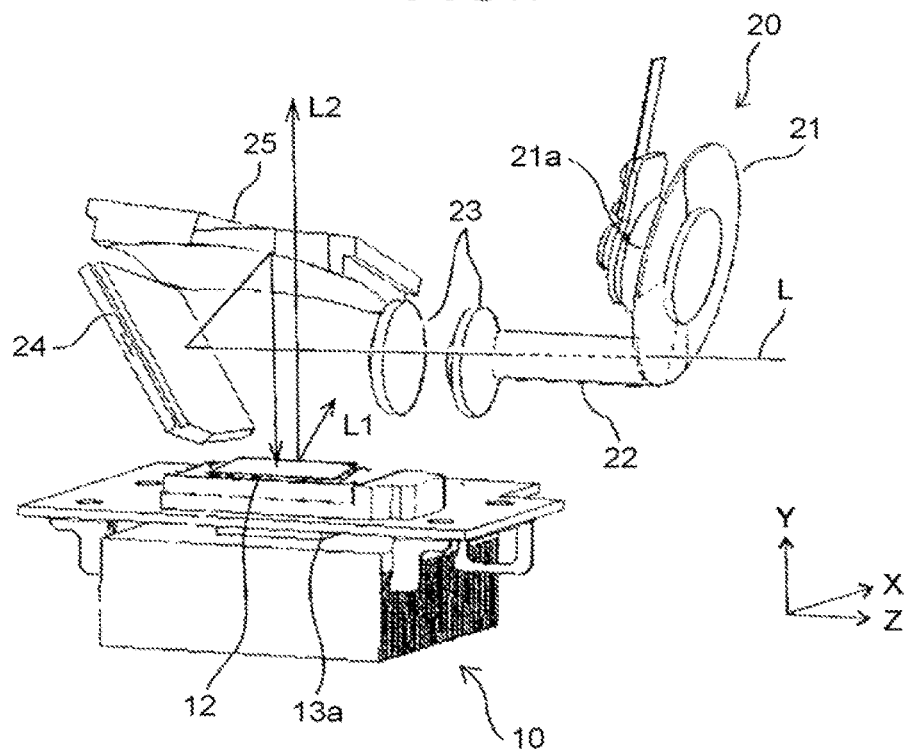
FIG. 7 is a perspective view illustrating light paths in the lighting unit.

FIG. 7 is for explaining the light path L of the light in the lighting unit 20.

The color wheel 21 has a disc-like shape, and is fixed to a motor shaft of a color motor 21a. The color wheel 21 is provided with filters such as red (R) filer, green (G) filter, and blue (B) filter in a rotating direction. The light collected by the reflector disposed on the holder 64 of the light source unit 60 reaches a peripheral portion of the color wheel 21 through the emitting window 63. The light reached the peripheral portion of the color wheel 21 is split into R, G and B in a time divided manner by the rotation of the color wheel 21.

The light split by the color wheel 21 enters the light tunnel. 22. The light tunnel 22 has a square cylinder shape. The inner peripheral surface of the light tunnel 22 is a mirror surface. The light entered the light tunnel 22 is formed into a uniform surface light source while reflected multiple times on the inner surface of the light tunnel 22, and emitted to the relay lenses 23.

The light passed through the light tunnel 22 transmits two relay lenses 23, and is reflected by the cylinder mirror 24 and the concave mirror 25, and is collected on an image forming surface of the DMD 12 where an image is formed.

Next, the image forming unit 10 will be described.

Figure 8:
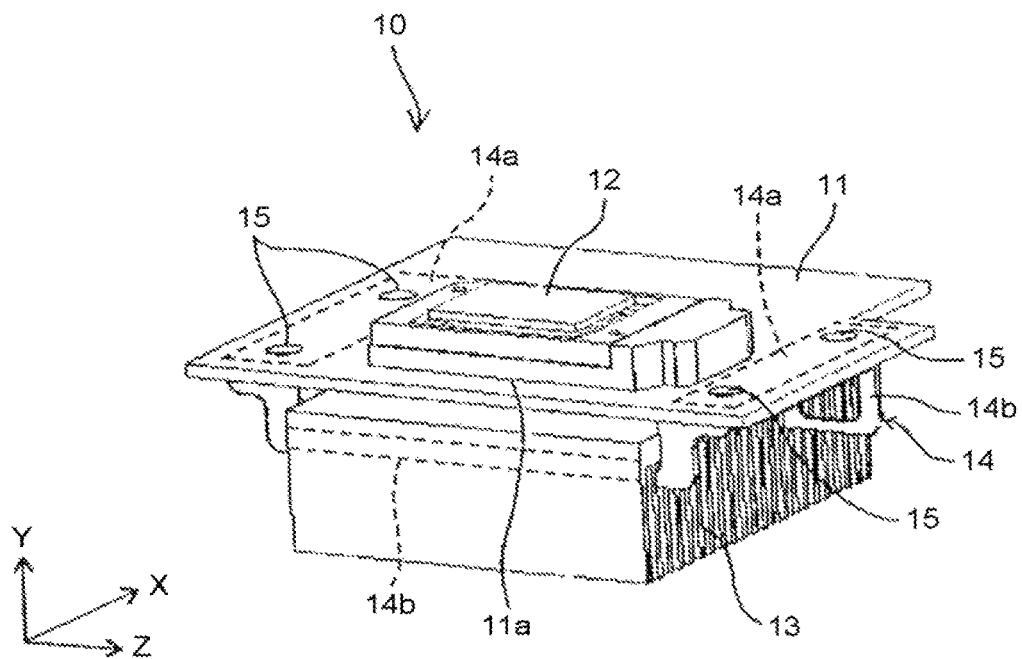
FIG. 8 is a perspective view illustrating the image forming unit.

FIG. 8 perspectively illustrates the image forming unit 10.

As illustrated in FIG. 8, the image forming unit 10 is provided with a DMD board 11 to which the DMD 12 is attached. The DMD 12 is attached to a socket 11a formed on the DMD board 11 so that the image forming surface in which micromirrors are arranged in an array (grid) faces upward. The DMD board 11 is provided with a drive circuit and the like for driving the DMD mirror. A heat sink 13 as a cooling unit to cool down the DMD 12 is fixed to a back side (an opposite side of the socket 11a formed side) of the DMD board 1. A portion of the DMD board 11 to which the DMD 12 is attached is opened through. The heat sink 13 is provided with a protrusion portion 13a (see FIG. 7) which engages with the through hole of the DMD board 11. A leading head of the protrusion portion 13a is flattened. This protrusion portion 13a is inserted into the through hole of the DMD board 11, so that the flat portion at the leading edge of the protrusion portion 13a abuts on the back surface (the opposite surface of the image forming surface) of the DMD 12. It is possible to improve the adhesiveness and thermal conductivity between the flat portion of the protrusion portion 13a and the back surface of the DMD 12 by applying an elastically deformable heat transfer sheet to the flat portion and/or a portion of the back surface of the DMD 12 on which the heat sink 13 abuts.

By a fix unit 14, the heat sink 13 is pressured and fixed to the DMD board 11 at a side opposite to a side at which the socket 11a is formed. The fix unit 14 includes plate-like fix portions 14a. One of the plate-like portions 14a faces the back surface of the DMD board 11 at a right side in the figure. The other plate-like portion 14a faces the back surface of the DMD board 11 at a left side in the figure. Pressure portions 14b are disposed near both ends in X direction of each fix portion 14a so that right and left fix portions 14a are connected.

The heat sink 13 is pressured and fixed by the fix unit 14 to the DMD board 11 at a side opposite to a side at which the socket 11a is formed, when the image forming unit 10 is screwed to the lighting bracket 26 (see FIG. 6).

Now, the fix procedure of the image forming unit 10 to the lighting bracket 26 will be described. First, the image forming unit 10 is positioned to the lighting bracket 26 so that the DMD 12 faces the opening of the lighting through hole 26d formed at the lower surface of the lighting bracket 26 of the lighting unit 20 as illustrated in FIG. 5. Next, screws are inserted from the lower side in the figure so that each screw goes through the through hole of the fix portion 14a and the through hole 15 of the DMD board 11. Each screw is screwed into a screw hole formed at the lower side of the screw portion 262 (see FIG. 3) formed on the lighting bracket 26. As the screw is screwed into the screw portion 262 of the lighting bracket 26, the pressure portion 14b presses the heat sink 13 toward the DMD board 11. Thereby, the heat sink 13 is pressed and fixed by the fix unit 14 to a surface of the DMD board 11 opposite to a surface on which the socket 11a is formed.

Thus, the image forming unit 10 is fixed to the lighting unit 26. As illustrated in FIG. 5, three legs 29 also support the weight of the image forming unit 10.

In the image forming surface of the DMD 12, a plurality of movable micromirrors are arranged in an array (grid). Each of micromirrors can tilt its mirror surface by a predetermined angle around a torsion axis. Thus, each of micromirrors can take ON position or OFF position. If a micromirror is at ON position, the light from the light source 61 is reflected to the first optical system 70 (see FIG. 2), as illustrated by an arrow L2 in FIG. 7. If a micromirror is at OFF position, the light from the light source 61 is reflected to the OFF light plate 27 held at the lateral side of the lighting bracket 26 as illustrated in FIG. 6 (see an arrow L1 in FIG. 7). Therefore, by driving each mirror independently, it is possible to control the light projection for each pixel of the image data and thus form the image.

The light reflected toward the OFF light plate 27 is absorbed as heat and then cooled by an ambient air flow.

Next, the first optical unit 30 will be described.

Figure 9:
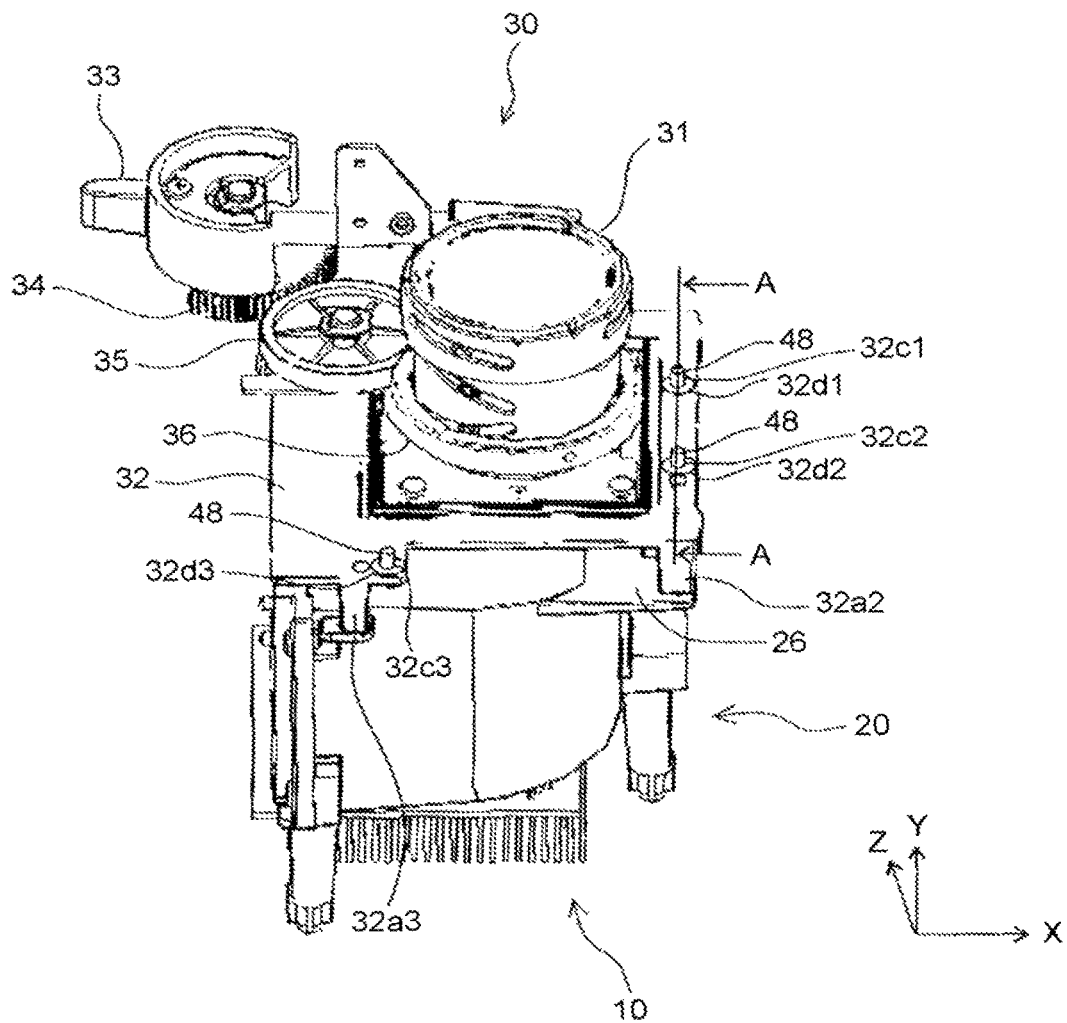
FIG. 9 is a perspective view illustrating a first optical unit with the lighting unit and the image forming unit.

FIG. 9 perspectively illustrates the first optical unit 30 with the lighting unit 20 and the image forming unit 10.

As illustrated in FIG. 9, the first optical unit 30 is disposed above the lighting unit 20. The first optical unit 30 is provided with the projection lens unit 31 holding the first optical system 70 (see FIG. 2) including a plurality of lenses, and the lens holder 32 for holding this projection lens unit 31.

The lens holder 32 has four legs 32a1 to 32a4 extending downward (in FIG. 9, only legs 32a2 and 32a3 are illustrated. The leg 32a1 is illustrated in FIG. 3, and the leg 32a4 is illustrated in FIG. 5). A screw hole is formed at a bottom surface of each of legs 32a1 to 32a4, for screwing each leg to the lighting bracket 26.

The projection lens unit 31 is provided with a focus gear 36 with which an idle gear 35 engages. The idle gear 35 engages with a lever gear 34. A focus lever 33 is fixed to a rotational axis of the lever gear 34. The leading edge of the focus lever 33 is exposed from the main body as illustrated in FIG. 1.

When the focus lever 33 is moved, the focus gear 36 is rotated via the lever gear 34 and the idle gear 35. When the focus gear 36 is rotated, the plurality of lenses composing the first optical system 70 in the projection lens unit 31 is moved toward predetermined directions so that a focus of the projection image is adjusted.

The lens holder 32 has four screw through holes 32c1 to 32c4 through which screws 48 penetrate for screwing the second optical unit 40 to the first optical unit 30 (in FIG. 9, three screw through holes 32c1 to 32c3 are illustrated. Each of three screw through holes is illustrated in a state that a screw 48 is penetrated. The edge of the screw 48 is viewed in the figure.) Around each of screw through holes 32c1 to 32c4, the second optical unit positioning protrusions 32d1 to 32d4 protruded from the surface of the lens holder 32 are formed (in FIGS. 9, 32d1 to 32d3 are illustrated).

Figure 10:
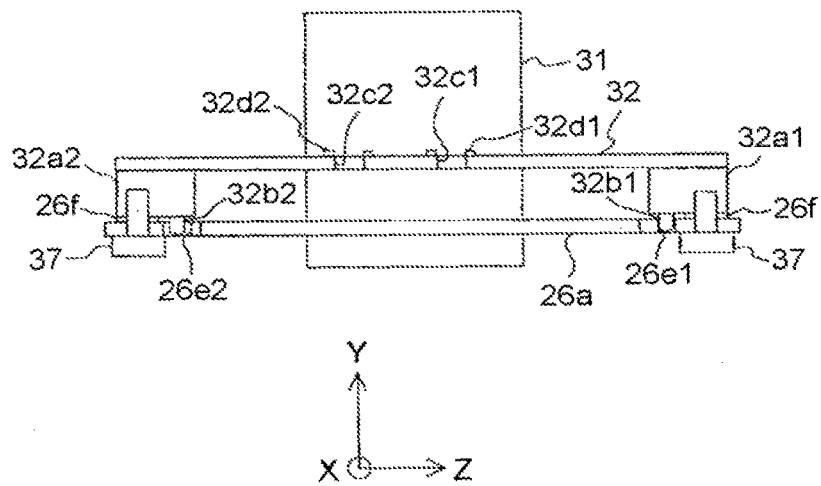
FIG. 10 is a sectional view along A-A line in FIG. 9.

FIG. 10 is a sectional view along A-A line in FIG. 9.

As illustrated in FIG. 10, legs 32a1 and 32a2 are provided with positioning joint protrusions 32b1 and 32b2, respectively. The positioning joint protrusion 32b1 at the right side in the figure is inserted into the round hole shaped positioning hole 26e1 which is formed as the main reference at the upper plate 26b of the lighting bracket 26. The positioning joint protrusion 32b2 at the left side in the figure is inserted into the elongate hole shaped positioning hole 26e2 which is formed as the sub reference on the upper plate 26b of the lighting bracket 26. Thus, the positioning in Z direction and X direction is done. Screws 37 are inserted into through holes 26c1 to 26c4 formed at the upper plate 26b of the lighting bracket 26, so that screws 37 are screwed into screw holes formed on each of legs 32a1 to 32a4 of the lens holder 32, and the first optical unit 70 is positioned and fixed to the lighting unit 20.

The upper portion of the projection lens unit 31 above the lens holder 32 is covered by a mirror holder 45 (see FIG. 12) of the second optical unit, which will be described later. As illustrated in FIG. 3, below the lens holder 32 of the projection lens unit 31, a portion of the projection lens unit 31 between the lens holder 32 and the upper plate 26b of the lighting bracket 26 of the lighting unit 20 is exposed. However, the light cannot enter from this exposed portion to the light path of the image, since the projection lens unit 31 engages with the lens holder 32.

Next, the second optical unit 40 will be described.

Figure 11:
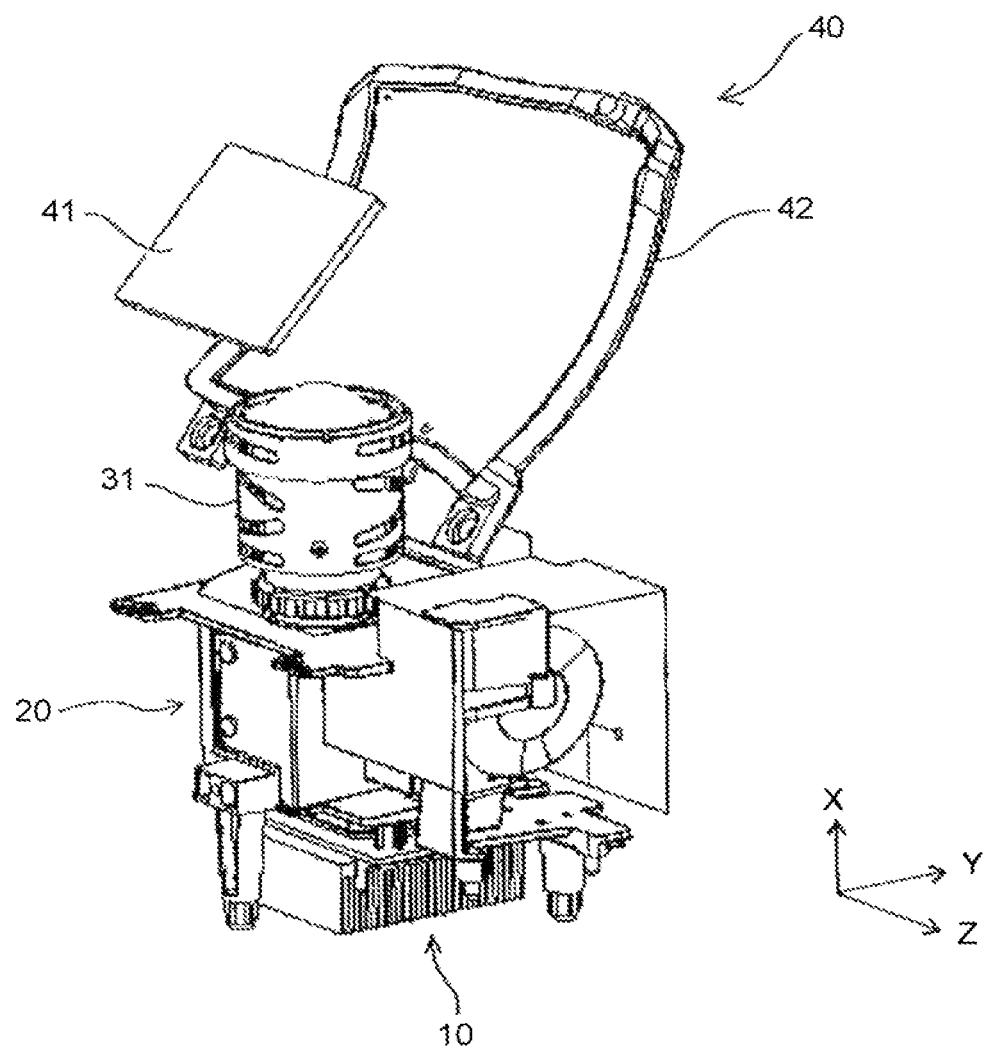
FIG. 11 is a perspective view illustrating a second optical system included in a second optical unit, with the projection lens unit, the lighting unit, and the image forming unit.

FIG. 11 perspectively illustrates the second optical system included in the second optical unit 40, while also illustrating the projection lens unit 31, the lighting unit 20 and the image forming unit 10.

As illustrated in FIG. 11, the second optical unit 40 is provided with the reflecting mirror 41 and the concavely curved mirror 42 composing the second optical system. A reflecting surface of the curved mirror 42 may be a spherical surface, a rotationally symmetric aspheric surface, a free curved surface or the like.

Figure 12:
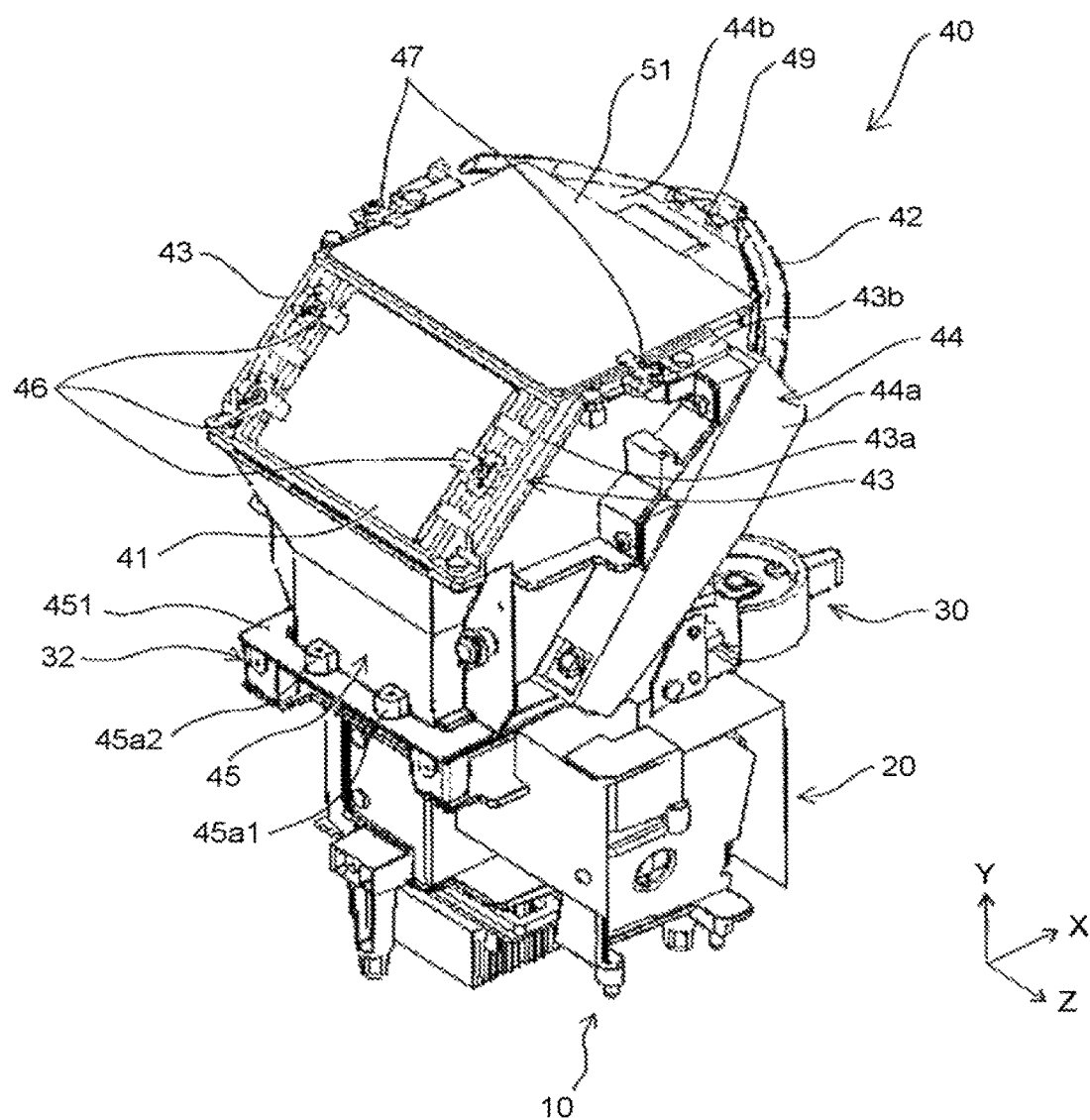
FIG. 12 is a perspective view illustrating the second optical unit with the first optical unit, the lighting unit, and the image forming unit.

FIG. 12 perspectively illustrates the second optical unit 40 with the first optical unit 30, the lighting unit 20, and the image forming unit 10.

As illustrated in FIG. 12, the second optical unit 40 is provided with a transmissive glass 51 for transmitting the light image reflected from the curved mirror 42 and for protecting optical components in the apparatus from dust.

The second optical unit 40 includes a mirror bracket 43 for holding the reflecting mirror 41 and the transmissive glass 51, a free mirror bracket 44 for holding the curved mirror 42, and the mirror holder 45 to which the mirror bracket 43 and the free mirror bracket 44 are attached.

The mirror holder 45 has a box shape. Specifically, it has a U shape when viewed from the upper side in which the upper side, the bottom side, and the depth side of X direction in the figure of the box are opened. Edge portions of the upper opening of the mirror holder 45 extend from the front side to the depth side in X direction at the front side and the depth side in Z direction. Each of these edge portions has an inclined portion and a parallel portion. The inclined portion inclines so that it is raised as it goes to the depth in X direction in the figure. The parallel portion is parallel to X direction in the figure. The inclined portion is on the front side of the parallel portion in X direction. An edge portion of the upper opening of the mirror holder 45 extending in Z direction at the front side in X direction in the figure is parallel to Z direction in the figure.

The mirror bracket 43 is attached to the upper part of the mirror holder 45. The mirror bracket 43 has an inclined surface 43a and a parallel surface 43b. The inclined surface 43a abuts on the inclined portion of the upper opening edges of the mirror holder 35, and inclines so that it is raised as it goes to the depth in X direction in the figure. The parallel surface 43b, which is parallel to X direction, abuts on the parallel portion of the upper opening edges of the mirror holder 45. The inclined surface 43a and the parallel surface 43b have openings, respectively. In these openings, the reflecting mirror 41 is held so that the opening of the inclined surface 43a is closed, and the transmissive glass 51 is held so that the opening of the parallel surface 43b is closed.

The reflecting mirror 41 is positioned and fixed to the inclined surface 43a of the mirror bracket 43 by pressing Z direction both ends of the reflecting mirror 41 against the inclined surface 43a of the mirror bracket 43 by a flat spring-like mirror pressing members 46. One Z direction end of the reflecting mirror 41 is fixed by two mirror pressing members 46, and the other Z direction end of the reflecting mirror 41 is fixed by one mirror pressing member 46.

The transmissive glass 51 is positioned and fixed to the mirror bracket 43 by pressing Z direction both ends of the transmissive glass 51 against the parallel surface 43b of the mirror bracket 43 by a flat spring-like glass pressing members 47. Each Z direction end of the transmissive glass 51 is fixed by one glass pressing member 47, respectively.

The free mirror bracket 44 for holding the curved mirror 42 has arms 44a at Z direction both sides thereof. Each of arms 44a declines so that it is lowered as it goes to the front side from the depth side in X direction in the figure. The free mirror bracket 44 also has a connecting portion 44b for connecting two arms 44a at an upper side of two arms 44a. With regard to this free mirror bracket 44, arms 44a are attached to the mirror holder 45 so that the curved mirror 42 covers the X direction depth side opening of the mirror holder 45.

The curved mirror 42 is fixed in such a manner that a substantial central portion of the transmissive glass side end of the curved mirror 42 is pressed against the connecting portion 44b of the free mirror bracket 44 by a plate spring-like free mirror pressing member 49, and Z direction both ends of the curved mirror 42 on the first optical system side are fixed to arms 44a of the free mirror bracket 44 by screws.

Figure 13:
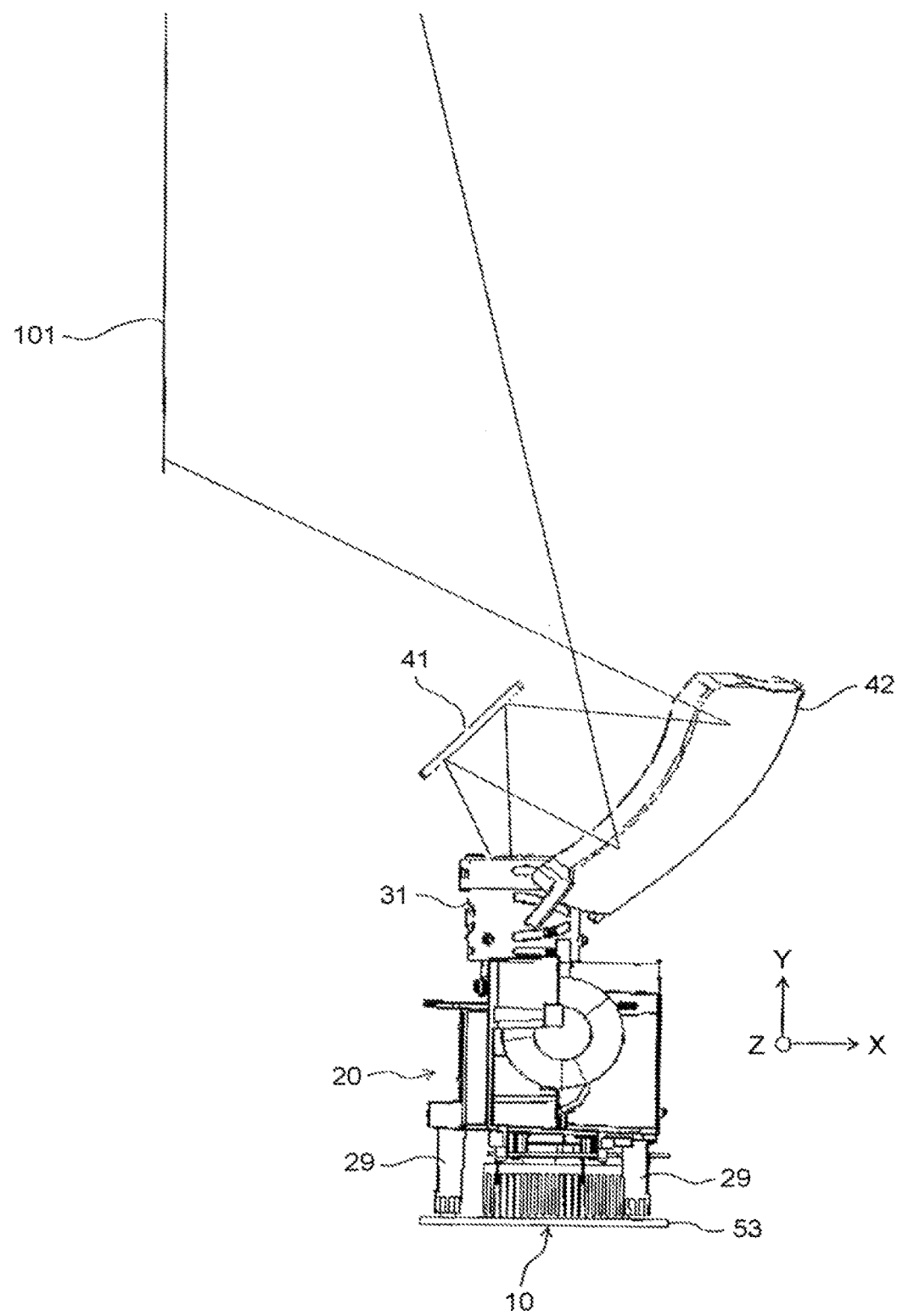
FIG. 13 is a perspective view illustrating light paths from the first optical system to the projection plane.

The second optical unit 40 is stacked on and fixed to the lens holder 32 of the first optical unit 30. Specifically, an under surface 451 is formed under the mirror holder 45 which faces the upper surface of the lens holder 32. The under surface 451 has four cylindrical screw joints 45a1 to 45a4 (only 45a1 and 45a2 are illustrated in FIG. 13, and 45a3 is illustrated in FIG. 6) formed for screwing the second optical unit 40 to the first optical unit 30. The second optical unit 40 is fixed to the first optical unit 30 in such a manner that screws 48 are penetrated through screw holes 32c1 to 32c4 formed on the lens holder 32 of the first optical unit 30, and then screwed and fastened into screw joints 45a1 to 45a4. At this time, the under surface of the mirror holder 45 of the second optical unit 40 abuts on the second optical unit positioning protrusions 32d1 to 32d4 of the lens holder 32, so that the second optical unit 40 is positioned in Y direction and fixed.

When the second optical unit 40 is stacked on and fixed to the lens holder 32 of the first optical unit 30, the upper portion of the projection lens unit 31 above the lens holder 32 as illustrated in FIG. 9 is housed in the mirror holder 45 of the second optical unit 40. When the second optical unit 40 is stacked on and fixed to the lens holder 32 of the first optical unit 30, a gap is made between the curved mirror 42 and the lens holder 32. The idle gear 35 (see FIG. 9) is inserted into the gap.

FIG. 13 perspectively illustrates the light paths from the first optical system 70 to the projection plane 101 (screen).

The light beam passed through the projection lens unit 31 composing the first optical system 70 forms an intermediate image conjugate to the image formed on the DMD 12 between the reflecting mirror 41 and the curved mirror 42. This intermediate image is formed as a curved mirror image between the reflecting mirror 41 and the curved mirror 42. Next, the optical image enters the concavely curved mirror 42, so that the intermediate image becomes a "further enlarged image" to be projected and formed on the projection plane 101 by the curved mirror 42.

Thus, owing to the structure in which the projection optical system is composed of the first optical system 70 and the second optical system, the intermediate image is formed between the first optical system 70 and the curved mirror 42 of the second optical system, and the intermediate image is enlarged and projected by the curved mirror 42, the projection distance can be shortened. Thus, the projectors can be used in small rooms.

As illustrated in FIG. 13, the first optical unit 30 and the second optical unit 40 are stacked on and fixed to the lighting bracket 26. Furthermore, the image forming unit 10 is also fixed. Therefore, legs 29 of the lighting bracket 26 are fixed to the base component 53 so that the legs 29 support weights of the first optical unit 30, the second optical unit 40 and the image forming unit 10.

Figure 14:
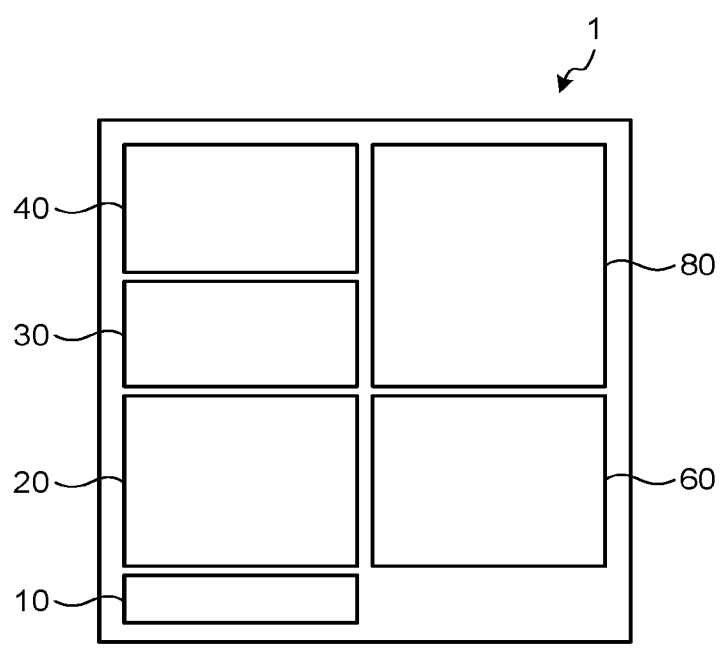
FIG. 14 is a schematic view illustrating an arrangement of units in the projector.

FIG. 14 schematically illustrates an arrangement of units in the projector.

As illustrated in FIG. 14, the image forming unit 10, the lighting unit 20, the first optical unit 30 and the second optical unit 40 are arranged in a stacked manner in Y direction which is a short axis direction of the projection plane. Relative to stacked units of the image forming unit 10, the lighting unit 20, the first optical unit 30 and the second optical unit 40, the light source unit 60 is disposed in Z direction which is a long axis direction of the projection plane. Thus, in the present embodiment, the image forming unit 10, the lighting unit 20, the first optical unit 30, the second optical unit 40 and the light source unit 60 are arranged in Y direction and Z direction which are parallel to the projection plane 101. More specifically, the image forming unit 10 and the lighting unit 20 form the image forming part A, while the first optical unit 30 and the second optical unit 40 form the projection optical part B. The light source unit 60 is connected to the image forming part A in a direction perpendicular to a direction in which the image forming part A and the projection optical part B are stacked. The image forming part A and the light source unit 60 are arranged along the same line parallel to the base component 53. The image forming part A and the projection optical part B are arranged along the same line perpendicular to the base component 53, in the order of the image forming part A and the projection optical part B from the base component 53.

In the present embodiment, above the light source unit 60, a power source unit 80 is stacked for supplying an electrical power to the light source 61 and the DMD 12. The light source unit 60, the power source unit 80, the image forming part A and the projection optical part B are housed in a case of the projector 1 made of an outer cover (see FIG. 18), which will be described later, covering the upper surface of the projector, the base component 53 and the surrounding of the projector 1.

Figure 15:
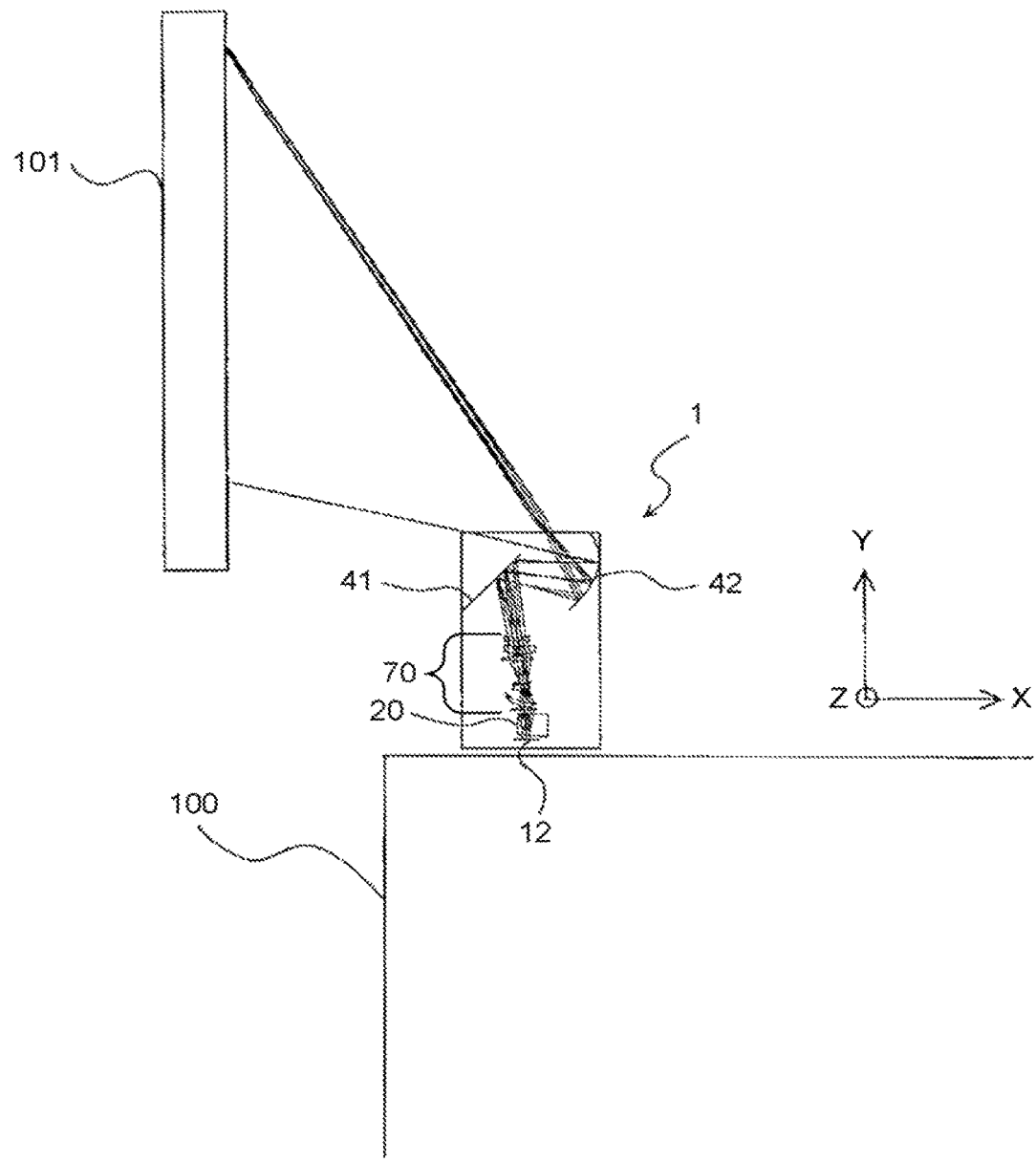
FIG. 15 is a view illustrating a usage example of the projector according to the embodiment.
Figure 16:
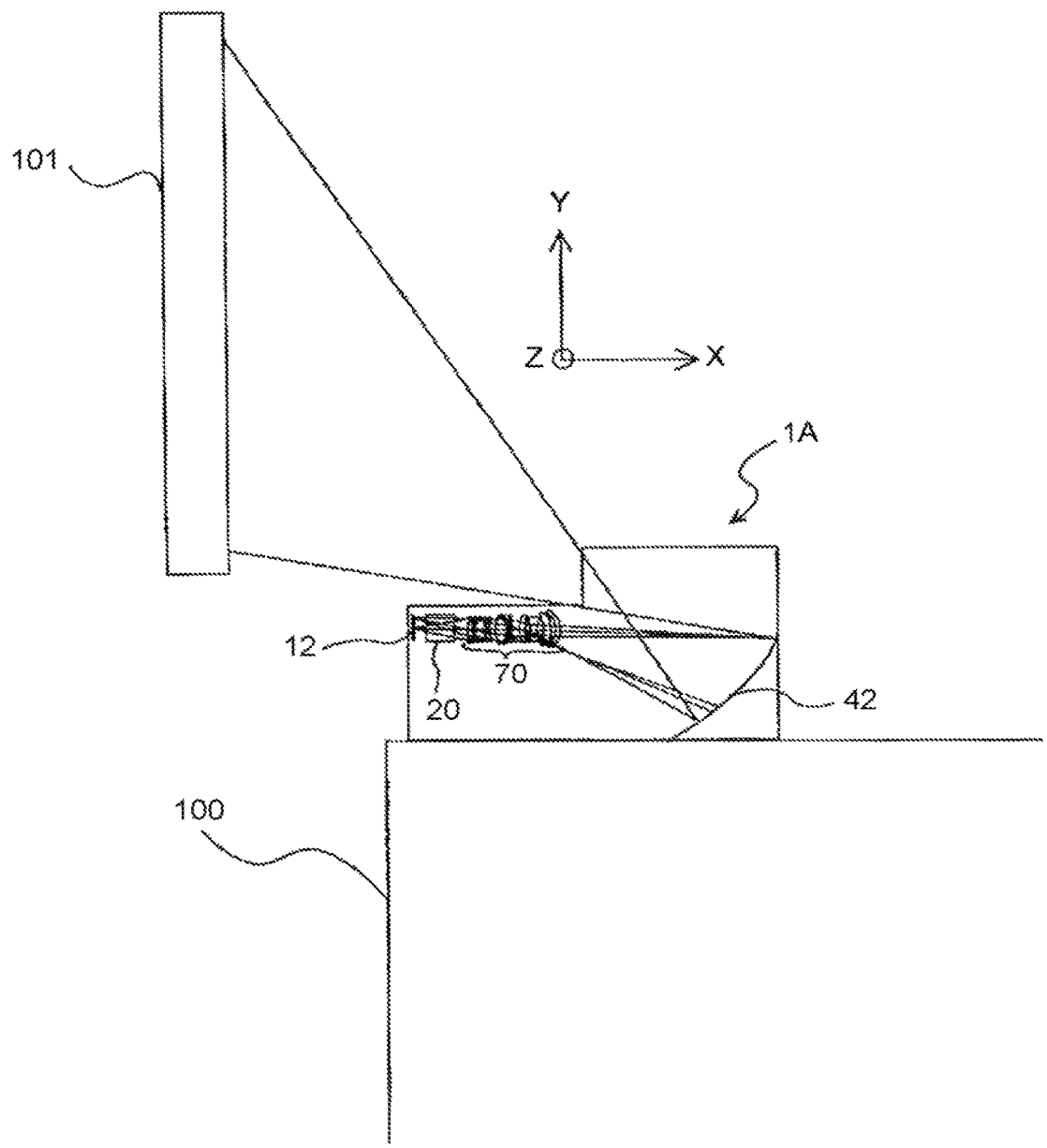
FIG. 16 is a view illustrating a usage example of a conventional projector.
Figure 17:
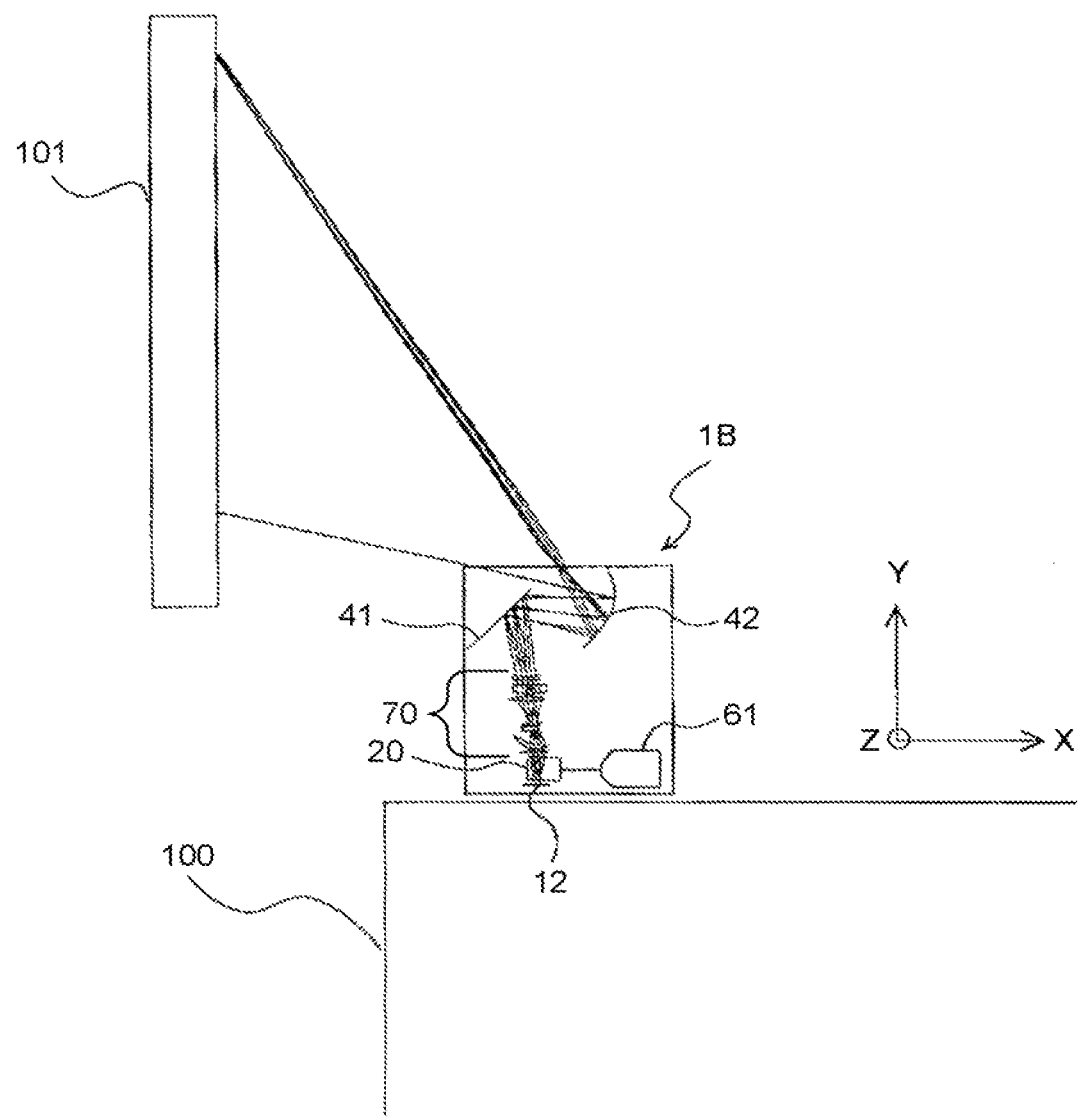
FIG. 17 is a view illustrating a usage example of another conventional projector.

FIG. 15 illustrates a usage example of the projector 1 according to the present embodiment. FIG. 16 and FIG. 17 illustrate usage examples of conventional projectors 1A and 1B.

As illustrated in FIG. 15 to FIG. 17, the projector is used in such a manner that the projector is put on a table 100 and an image is projected on the projection plane 101 such as a white board, when used in a meeting room or the like for example.

As illustrated in FIG. 16, in the conventional projector 1A, a DMD 12 (image forming element), a lighting unit 20, a first optical system 70, and a second optical system (curved mirror 42) are arranged in series in a direction orthogonal to a plane of a projection image projected on a projection plane 101. Therefore, the projector 1A is elongated in the direction (X direction) orthogonal to the projection plane of the projector 1A. Thus, the projector 1A occupies a space in the direction orthogonal to the projection plane 101. Desks and chairs used by viewers of the image projected on the projection screen 101 are generally arranged in the direction orthogonal to the projection plane. Thus, if the projector occupies the space in the direction orthogonal to the projection plane, the layout space allowed for desks and chairs is limited. It is inconvenient.

In the projector 1B illustrated in FIG. 17, a DMD 12 (image forming element), a lighting unit 20 and a first optical system 70 are arranged in series parallel to a plane of a projection image projected on a projection plane 101. Therefore, in comparison with the projector 1A illustrated in FIG. 16, a length in a direction orthogonal to the projection plane 101 can be shortened. However, in the projector 1B illustrated in FIG. 17, relative to the lighting unit 20, a light source 61 is arranged in the direction orthogonal to the plane of the projection image. Therefore, the length in the direction orthogonal to the projection plane 101 of the projector cannot be sufficiently shortened.

On the other hand, in the projector 1 according to the present embodiment illustrated in FIG. 15, the image forming part A composed of the image forming unit 10 and the lighting unit 20 and the projection optical part B composed of the first optical unit 30 and the reflecting mirror 41 are arranged in series along Y direction in the figure among directions parallel to the projection plane 101 and the image plane of the projection image projected on the projection plane 101. Furthermore, the light source unit 60 and the lighting unit 20 are arranged in series along Z direction in the figure among directions parallel to the plane of the projection image projected on the projection plane 101. Namely, the projector 1 according to the present embodiment has a configuration in which the light source unit 60, the image forming unit 10, the lighting unit 20, the first optical unit 30, and the reflecting mirror 41 are arranged in directions (Z and Y directions in the figure) parallel to the plane of the projection image projected on the projection plane 101. Each of the light source unit 60, the image forming unit 10, the lighting unit 20, the first optical unit 30, and the reflecting mirror 41 is arranged so as to intersect a plane parallel to the projection plane and the image plane of the projection image. Thus, since the light source unit 60, the image forming unit 10, the lighting unit 20, the first optical unit 30, and the reflecting mirror 41 are arranged in directions (Z and Y directions in the figure) parallel to the plane of the projection image projected on the projection plane 101, a length in a direction (X direction in the figure) orthogonal to the projection plane 101 can be shortened as illustrated in FIG. 15, in comparison with projectors illustrated in FIG. 16 and FIG. 17. Thereby, the projector 1 cannot be an obstacle for the layout of desks and chairs in view of spaces. Thus, it is possible to provide the convenient projector 1.

In the present embodiment, as illustrated in FIG. 14, above the light source unit 60, the power source unit 80 for supplying the electrical power to the light source 61 and the DMD 12 is disposed in a stacked manner. Thereby, a length of the projector 1 in Z direction is also shortened.

In the present embodiment, the second optical system is composed of the reflecting mirror 41 and the curved mirror 42. However, the second optical system may be composed only of the curved mirror 42. The reflecting mirror may be a flat mirror, a mirror having a positive refractive power, or a mirror having a negative refractive power. In the present embodiment, the concave mirror is used as the curved mirror 42. However, a convex mirror may be used. In this case, the first optical system 70 is configured so that an intermediate image is not formed between the first optical system 70 and the curved mirror 42.

The light source 61 is to be replaced periodically, since its life time ends after use over time. For this purpose, in the present embodiment, the light source unit 60 is arranged detachably from and attachably to the main body.

Figure 18:
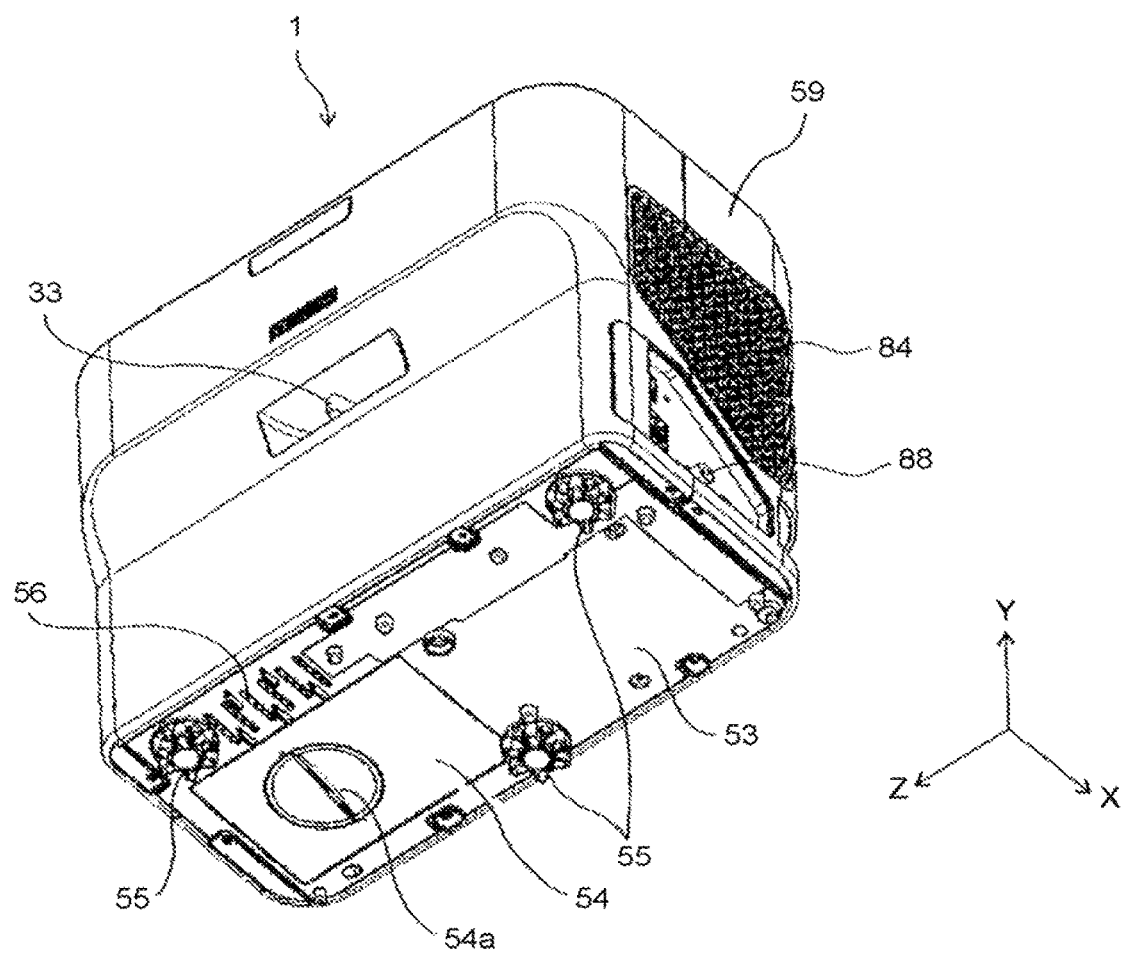
FIG. 18 is a perspective view illustrating the projector from an installation side thereof.

FIG. 18 perspectively illustrates an installation side of the projector 1.

As illustrated in FIG. 18, the base component 53 constituting the bottom surface of the projector 1 is provided with an access cover 54 (openable/closeable cover). The access cover 54 is provided with a rotating operating member 54a. The rotating operating member Ma can be rotated to release the lock between the access cover 54 and the main body, so that the access cover can be removed from the main body. Electrical power air inlets 56 are disposed adjacent in X direction to the access cover 54 of the base component 53.

As illustrated in FIG. 18, in one of XY planes of an outer cover 59 of the projector 1, an air inlet 84, and an external input portion 88 from which the image data or the like is input from an external device such as a PC are disposed.

Figure 19:
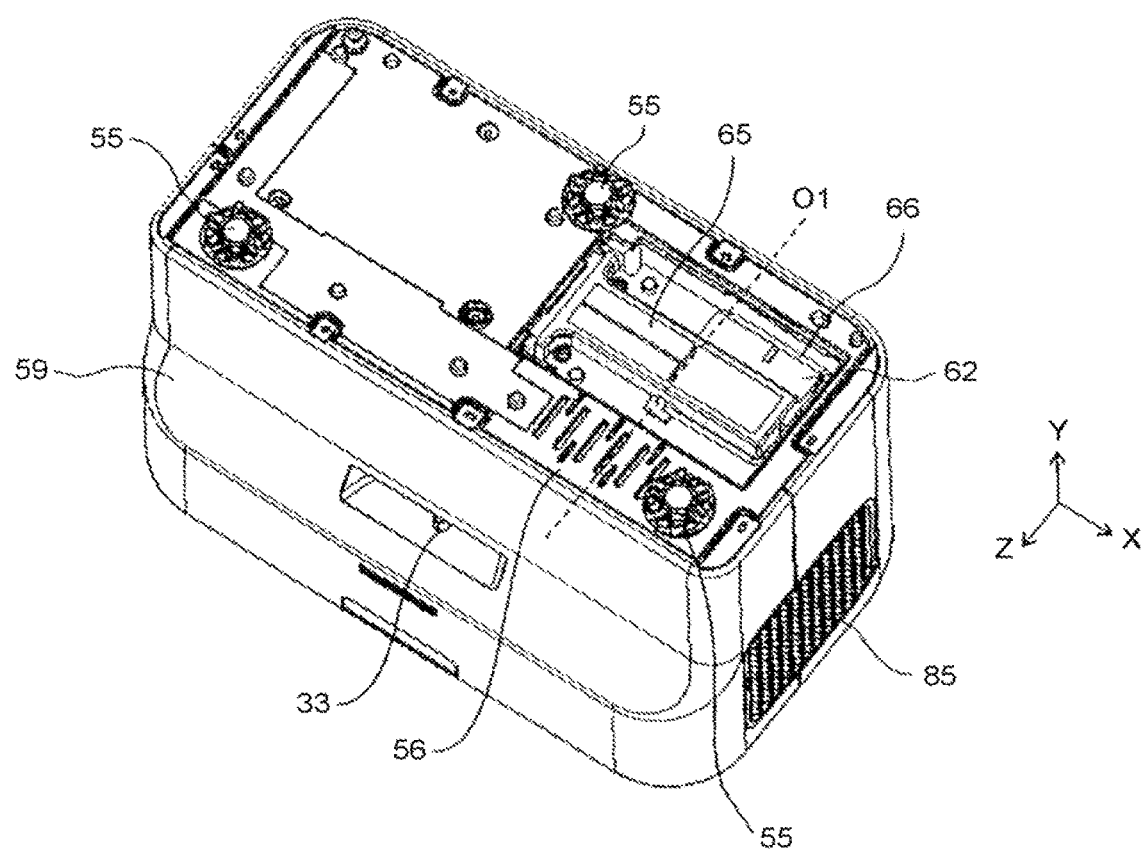
FIG. 19 is a perspective view illustrating a state that an access cover is removed from the apparatus.

FIG. 19 perspectively illustrates a state that the access cover 54 is removed from the main body.

As illustrated in FIG. 19, if the access cover 54 is removed, a side of the light source bracket 62 opposite to a side on which the light source 61 is mounted in the light source unit 60 is exposed. A handle portion 66 is rotatably attached to the light source bracket 62 so that the handle portion 66 can rotate around a dotted line 01 in the figure relative to the light source bracket 62.

When the light source unit 60 is to be removed from the main body, the handle portion 66 is rotated, pinched and pulled toward the nearer side in the figure, so that the light source unit 60 is removed from the opening of the main body. When the light source unit 60 is to be mounted to the main body, the light source unit 60 is inserted from the opening of the main body. As the light source unit 60 is inserted into the main body, the connecting portion 62a as illustrated in FIG. 4 connects with the power source side connector of the main body. Three light source positioning portions 64a1 to 64a3 of the holder 64 as illustrated in FIG. 4 engage with three light source positioning joint portions 26a1 to 26a3 formed on the lighting bracket 26 of the lighting unit 20 as illustrated in FIG. 6, so that the light source unit 60 is positioned to the main body. Thus, the mounting of the light source unit 60 is completed. Then, the access cover 54 is attached to the base component 53. In the present embodiment, the light source unit 60 has the handle portion 66. However, an airflow path 65 protruded toward the access cover 54 as illustrated in FIG. 19 may be used as the handle portion.

The base component 53 has three legs 55. By rotating these legs 55, the protruded extent of legs 55 from the base component 53 can be changed, and the adjustment in the height direction (Y direction) can be done.

As illustrated in FIG. 19, in the other XY plane of the outer cover 59, an exhaust outlet 85 is disposed.

Figure 20:
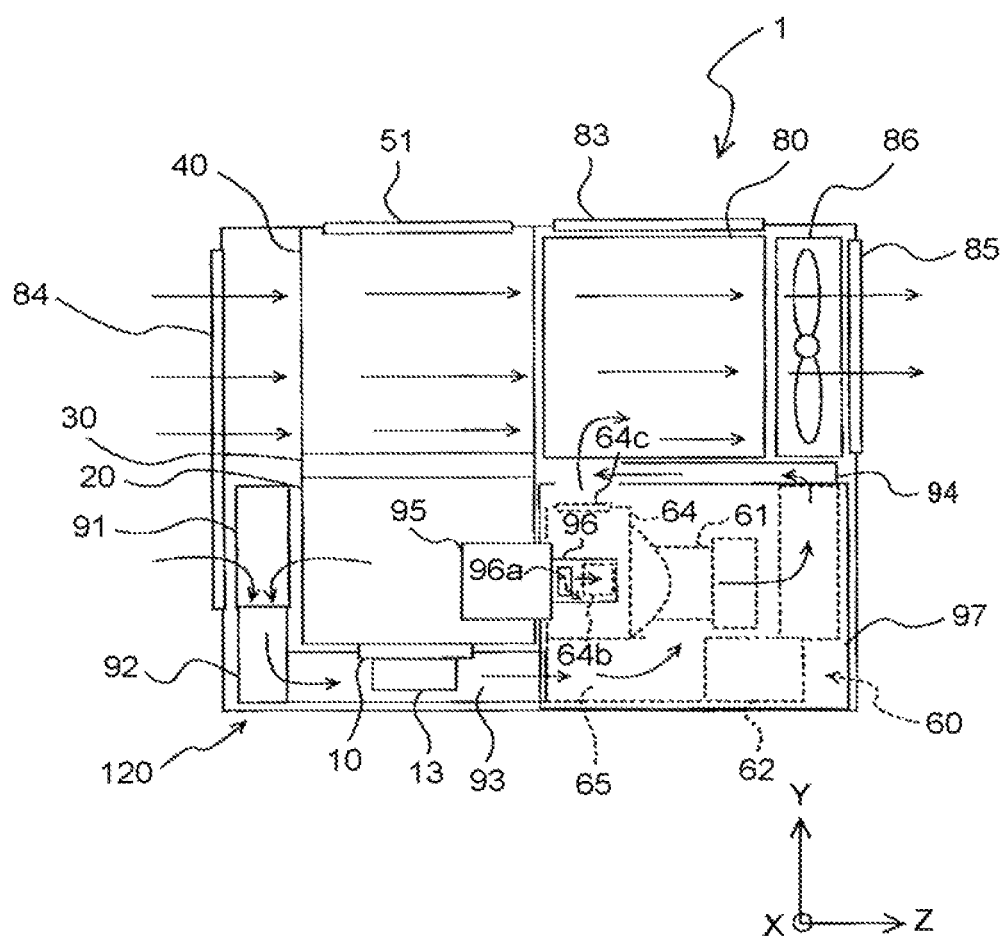
FIG. 20 is a schematic view illustrating airflows in the projector.
Figure 21:
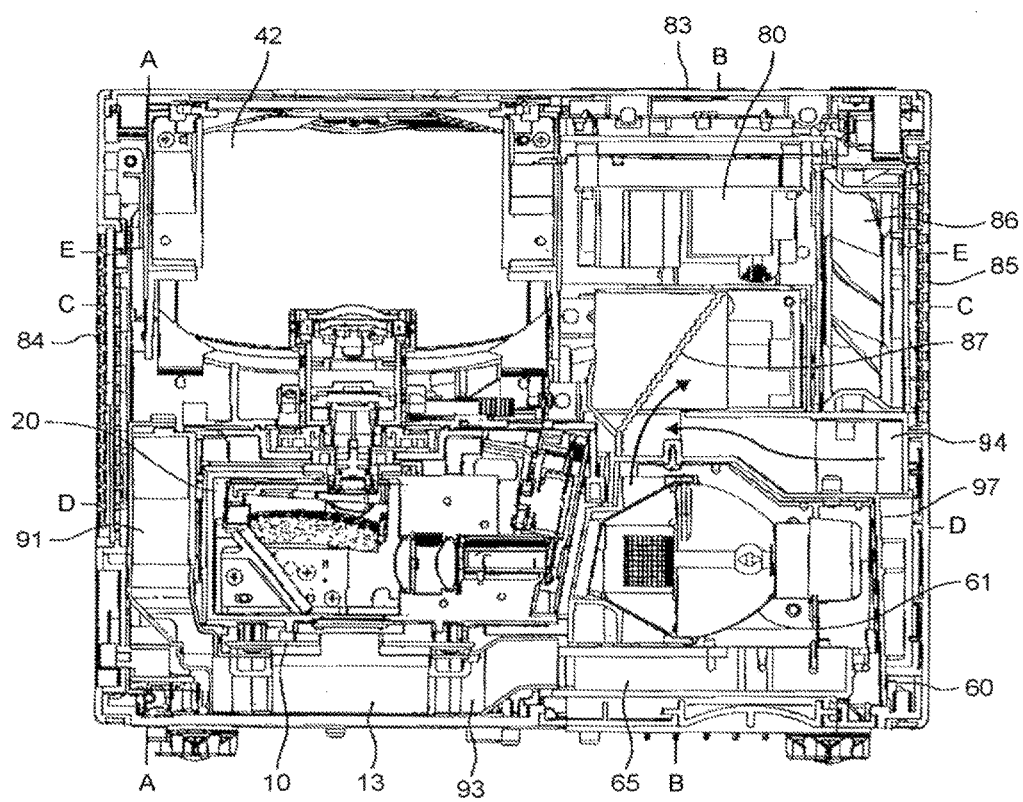
FIG. 21 is a view illustrating the configuration illustrated in FIG. 20 more specifically.

FIG. 20 is a view illustrating air flows in the projector 1 according to the present embodiment. In FIG. 20, the projector 1 is viewed from the direction (X direction) orthogonal to the projection plane 101. In FIG. 21, schematically illustrated components in FIG. 20 are specifically illustrated carrying the same reference numerals. In FIG. 20 and FIG. 21, arrows indicate directions to which air flows.

Figure 22:
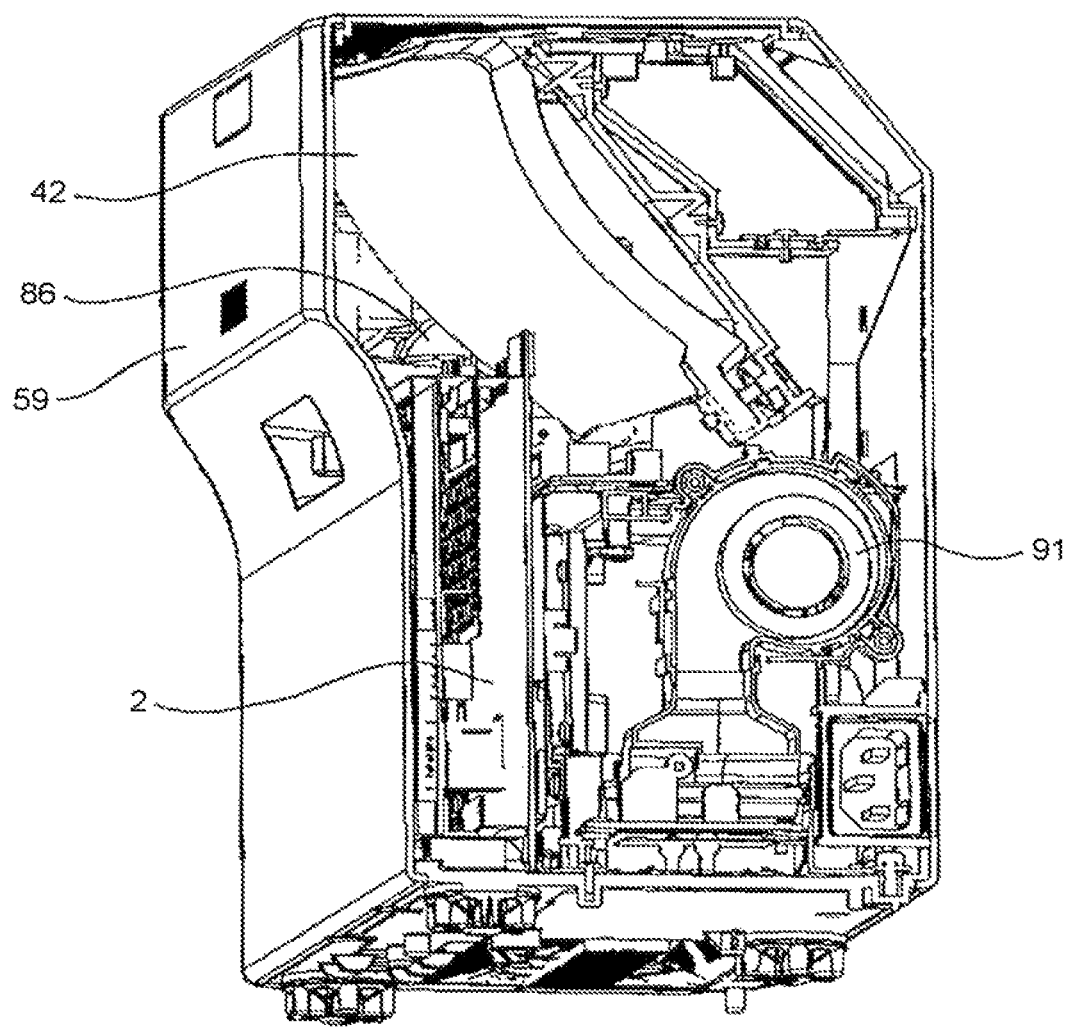
FIG. 22 is a section along A-A line in FIG. 21.
Figure 23:
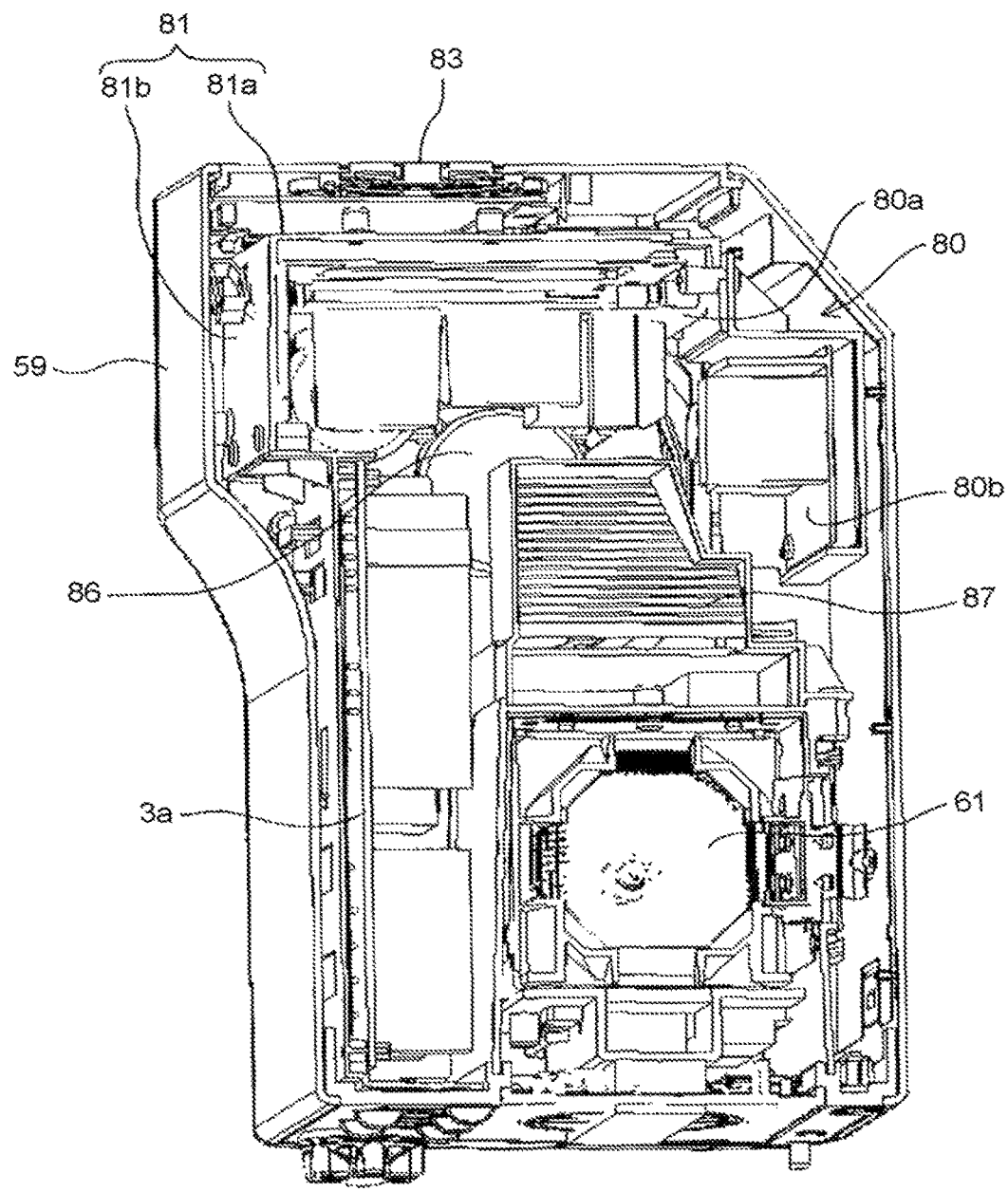
FIG. 23 is a section along B-B line in FIG. 21.
Figure 24:
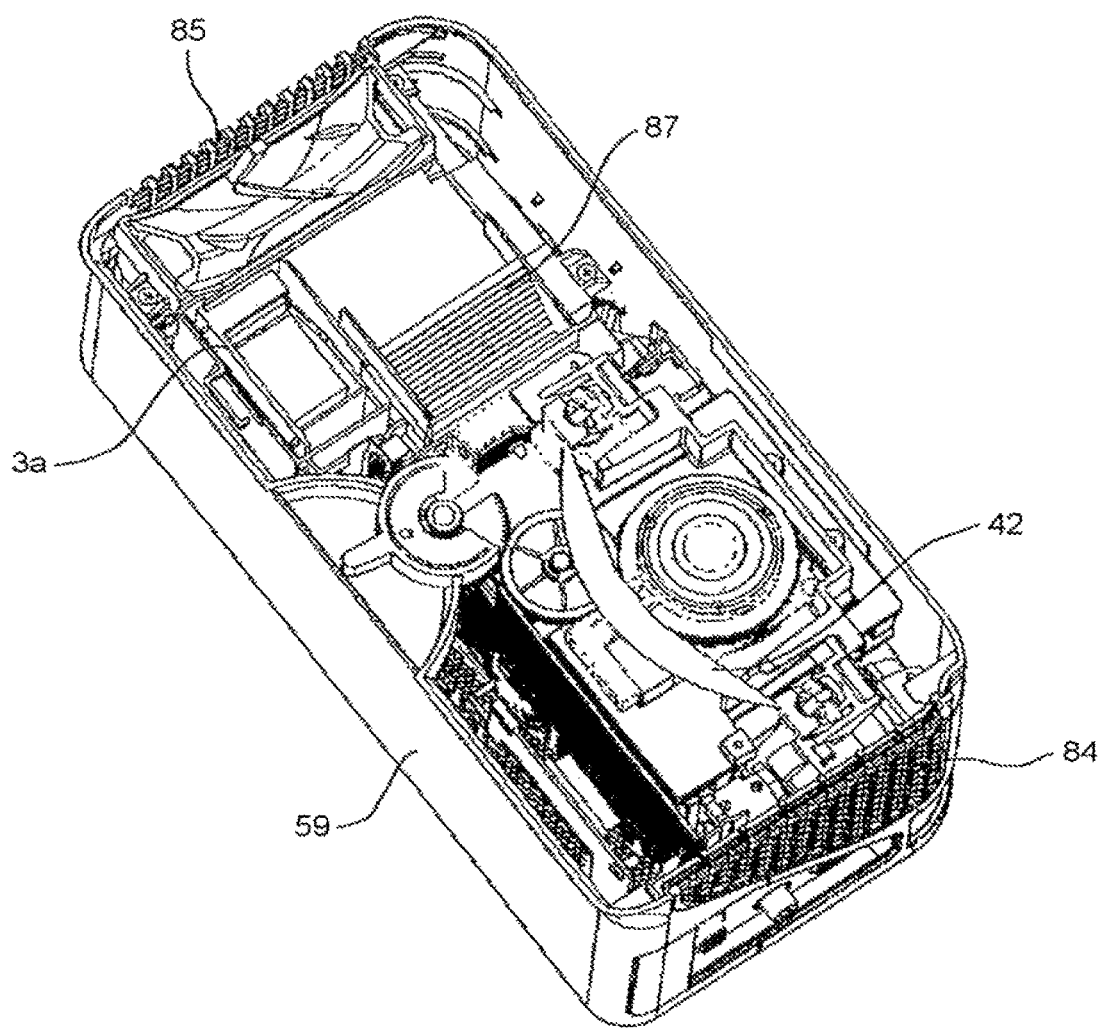
FIG. 24 is a section along C-C line in FIG. 21.
Figure 25:
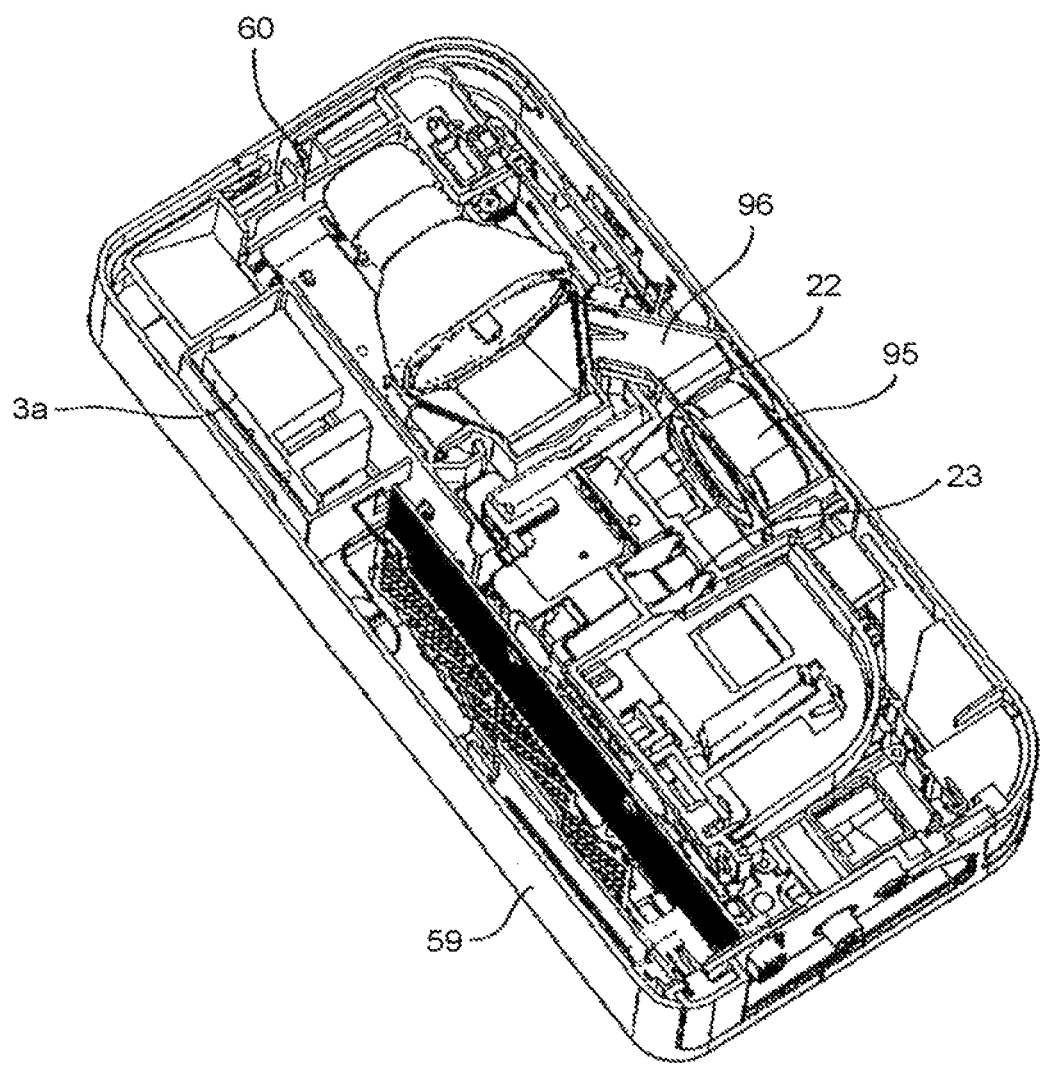
FIG. 25 is a section along D-D line in FIG. 21.
Figure 26:
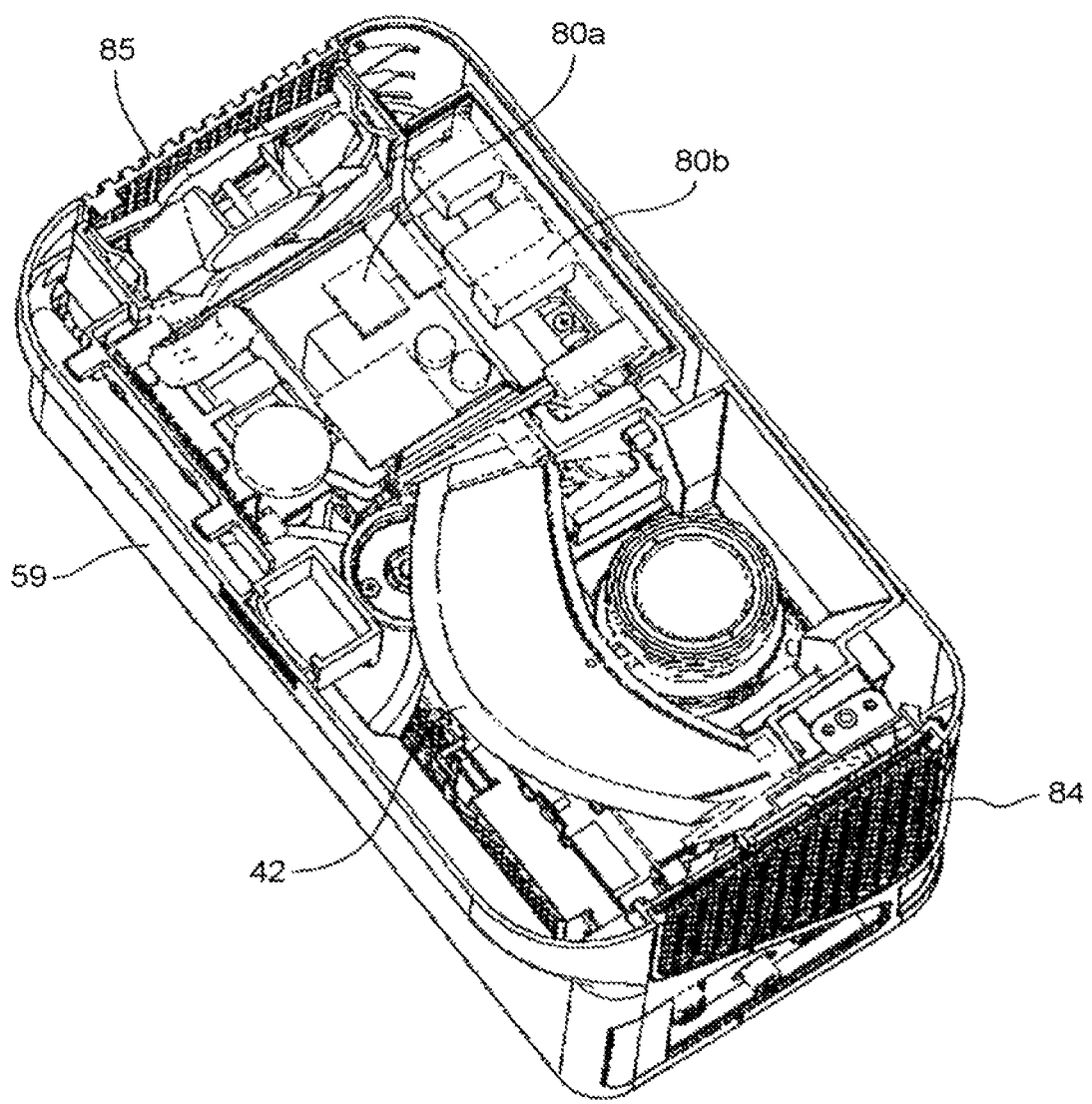
FIG. 26 is a section along E-E line in FIG. 21.

FIG. 22 is a cross section along A-A line of FIG. 21. FIG. 23 is a cross section along B-B line of FIG. 21. FIG. 24 is a cross section along C-C line of FIG. 21. FIG. 25 is a cross section along D-D line of FIG. 21. FIG. 26 is a cross section along E-E line of FIG. 21.

As illustrated in FIG. 20, at one side (left side in the figure) of the projector 1, the air inlet 84 is formed for taking an ambient air into the projector 1. At another side (right side in the figure) of the projector 1, the exhaust outlet 85 is formed for discharging the air inside of the projector 1. An exhaust fan 86 is disposed so as to face the exhaust outlet 86.

The exhaust outlet 85 and a part of the air inlet 84 are located at a level between the light source unit 60 and the operating part 83, when the projector 1 is viewed from the direction (X direction) orthogonal to the projection plane 101. Furthermore, a flow path is formed between the back surface of the curved mirror 42 and the outer cover 59 facing the back surface of the curved mirror 42 for allowing the airflow therethrough. Thereby, the ambient air taken from the air inlet 84 flows to ZY plane of the mirror holder 45 and the back surface of the curved mirror 42 of the second optical unit 40 as illustrated in FIG. 12. Along the mirror holder 45 and the back surface of the curved mirror 42, the air flows toward the exhaust outlet 85 (see FIG. 22, FIG. 24, and FIG. 26). The curved mirror 42 is a concave mirror having a positive power as mentioned above. The back surface of the curved mirror 42 has a convex shape almost along the front side shape thereof. The power source unit 80 disposed above the light source unit 60 has an almost U shape without only an edge on the light source unit side 60 when viewed from Z direction in the figure (see FIG. 23). The air taken from the air inlet 84 flows along the mirror holder 45 and the back surface of the curved mirror 42 toward the exhaust outlet 84, so that the air flows into a space surrounded by the power source unit 80 on three sides of the space excepting the light source unit 60 side and is then discharged from the exhaust outlet 85.

Thus, the exhaust outlet and the part of the air inlet are located at a level between the light source unit 60 and the operating part 83 when the projector 1 is viewed from the direction (X direction) orthogonal to the projection plane 101. Thereby, there is generated the airflow which flows between the light source unit 60 and the operating part 83 and is then discharged from the exhaust outlet 85.

A light source blower 95 (see FIG. 25) is disposed at a position allowing for suctioning the air around the color motor 21a (see FIG. 5) to drive and rotate the color wheel 21 of the lighting unit 20. Thereby, the color motor 21a and the light tunnel 22 can be cooled by the airflow generated by the air suction of the light source blower 95.

The air suctioned by the light source blower 95 flows to the light source air inlet 64b (see FIG. 4) of the holder 64 through the light source duct 96. A part of the air flows into the light source duct 96 flows from an opening 96a, which is formed on the light source duct 96 on a side facing the outer cover 59 (see FIG. 19), to between the light source housing 97 and the outer cover 59.

The air flowing from the opening 96a of the light source duct 96 to between the light source housing 97 and the outer cover 59 cools down the light source housing 97 and the outer cover 59, and is then discharged from the exhaust outlet 85 by the exhaust fan 86.

The air flowing to the light source air inlet 64b flows into the light source 61. After cooling the light source 61, the air is discharged from the light source air outlet 64c formed on the upper surface of the holder 64. The air discharged from the light source air outlet 64c flows toward the exhaust outlet 85 along a fluid guide 87 from the opening on the top surface of the light source housing 97 as illustrated in FIG. 21. Then, the air is mixed with the low temperature air which flows along the outside of the second optical unit 40 and flows into the space surrounded by the power source unit 80. Then, the air is discharged from the exhaust outlet 85 by the exhaust fan 86. Thus, the high temperature air discharged from the light source air outlet 64c is mixed with the ambient air and then discharged to the ambient. Thereby, it is possible to prevent the temperature rise of the air discharged from the exhaust outlet 85. Incidentally, the fluid guide 87 is not necessarily required. Even if the fluid guide 87 is not equipped, the high temperature air exhausted from the light source exhaust outlet 64c is exhausted from the exhaust outlet 85 by the airflow toward the exhaust outlet 85 from the air inlet 84 via the back surface of the curved mirror 42 in a space surrounded by a main PFC power source board 80a and a sub PFC power source board 80b, which will be described later. On the other hand, employing the fluid guide 87 can prevent the high temperature air, which is exhausted from the light source exhaust outlet 64c, from flowing directly to near the main PFC power source board 80a and the sub PFC power source board 80b. However, if it is attempted to avoid all the high temperature air, which is exhausted from the light source exhaust outlet 64c, from the main PFC power source board 80a and the sub PFC power source board 80b, all the high temperature air is not mixed with the air passed through the back surface of the curved mirror 42. Thus, all the high temperature air is exhausted from the exhaust outlet 85 without cooling or lowering its temperature. Therefore, the exhaust outlet 85 becomes hot. Therefore, it is better for the user that at least a part of the air exhausted from the light source exhaust outlet 64c and passed through the fluid guide 87 flows through the space surrounded by the main PFC power source board 80a and the sub PFC power source board 80b. That is because the air is certainly mixed with the air flowing from the air inlet 84 to the exhaust outlet 85 via the back surface of the curved mirror 42.

The operating part 83 operated by the user is preferably formed on the upper surface of the apparatus for the easy operation by the user. In the present embodiment, however, since the transmissive glass 51 is disposed on the upper surface of the projector 1 for the purpose of projecting the image on the projection plane 101, the operating part 83 needs to be disposed above the light source 61 as if they overlap each other when the projector 1 is viewed from the Y direction.

In the present embodiment, the high temperature air after cooling the light source 61 is guided to the exhaust outlet 85 by the airflow from the air inlet 84 to the exhaust outlet 85 between the light source unit 60 and the operating part 83. This high temperature air is prevented from flowing to the operating part 83. Thereby, the operating part 83 is prevented from being heated by the high temperature air after cooling the light source 61. Furthermore, a part of the air which flows from the air inlet 84 to the exhaust outlet 85 via the outside of the second optical unit 40 cools the operating part 83 by flowing beneath the operating part 83. This also contributes to the prevention of the temperature rise of the operating part 83.

Owing to the air suction of the exhaust fan 86, the ambient air is suctioned from the power source air inlets 56 formed on the base component 53 as illustrated in FIG. 19. At the X direction depth side in the figure beyond the light source housing 97, a ballast board 3a (see FIG. 24 and FIG. 25) for supplying a stabilized electrical power (electrical current) to the light source 61 is disposed. The ambient air suctioned from the power source air inlets 56 moves upward through between the light source housing 97 and the ballast board 3a. While this movement, the air cools the ballast board 3a. Then, the air flows into the space surrounded by the power source unit 80 disposed above the ballast board. Then, the air is discharged from the exhaust outlet 85 by the exhaust fan 86.

In the present embodiment, the fan which generates the airflow from the air inlet 84 to the exhaust outlet 85 is disposed as the exhaust fan 86 at the exhaust side. Therefore, in comparison with a case that the fan is disposed at the air inlet side, an amount of air supplied to the inside of the apparatus from the air inlet 84 can be increased. If the fan is disposed near the air inlet 84, an amount of the ambient air flowing to the inside of the apparatus decreases because of the second optical unit 40, since the second optical unit 40 is located in a direction to which the air is directed by the fan. On the other hand, in the case that the fan is disposed as the exhaust fan 86 near the exhaust outlet 85, there is no object in a direction beyond the exhaust outlet 85, usually. Therefore, an amount of the air exhausted by the exhaust fan 86 does not decrease. Therefore, the air is taken from the air inlet 84 as much as the air exhausted by the exhaust fan 86. Consequently, an amount of the air supplied from the air inlet to the inside of the apparatus does not decrease. Therefore, it is possible to make airflow from the air inlet 84 to the exhaust outlet 85 with a predetermined pressure. Thereby, the heated air raised from the light source 61 can be advantageously directed to the exhaust outlet 85 by the airflow from the air inlet 84 to the exhaust outlet 85.

At the lower left side of the main body in the figure, a cooling unit 120 is disposed for cooling the heat sink 13 of the image forming unit 10 and the light source bracket 62 of the light source unit 60. The cooling unit 120 is provided with an air intake blower 91, a vertical duct 92, and a horizontal duct 93.

The air intake blower 91 is disposed facing the air inlet 84 at the lower part of the inlet 84. The ambient air is taken from one side of the blower 91 facing the air inlet 84 through the air inlet 84. The air inside of the apparatus is taken from the other side of the blower 91 which is opposite to the one side facing the air inlet 84. The taken air is directed to the vertical duct 92 disposed under the blower 91. The air directed to the vertical duct 92 moves downward and is then directed to the horizontal duct 93 connected to the vertical duct 92 at the lower part of the duct 92.

A heat sink 13 is disposed in the horizontal duct 93. The heat sink 13 is cooled by the air flowing in the horizontal duct 93. By cooling the heat sink 13, the DMD 12 can be cooled effectively. Thus, the DMD 12 can be prevented from being heated to high temperature.

The air moved through the horizontal duct 93 flows in the airflow path 65 or the openings 65a formed in the light source bracket 62 of the light source unit 60 as illustrated in FIG. 4. The air entered the openings 65a flows to between the access cover 54 and the light source bracket 62, so that the access cover 54 is cooled.

On the other hand, the air entered the airflow path 65 cools the light source bracket 62 and then flows to a part of the light source 61 opposite to the emitting side of the light source 61, so that a part of the light source 61 opposite to the reflecting surface of the reflector 67 is cooled. Thus, the reflector 67 of the light source 61 is cooled. Therefore, the air flowing through the airflow path 65 takes heat from both the light source bracket 62 and the light source 61. The air passed around the reflector 67 flows through an exhaust duct 94 which directs the air from a level (height) of the light source bracket 62 to a level around the lower portion of the exhaust fan 86. Then, the air combines with the air discharged from the light source air outlet 64c, and flows to the exhaust outlet 85 through a fluid guide 87. The air is discharged from the exhaust outlet 85 by the exhaust fan 86. On the other hand, the air which flows between the access cover 54 and the light source bracket 62 through the openings 65a moves inside of the apparatus after cooling the access cover 54, so that the air is discharged from the exhaust outlet 85 by the exhaust fan 86.

The light source bracket 62 is provided with the airflow path 65, so that the light source bracket 62 is cooled and thereby the temperature rise of the light source 61 is suppressed. Thereby, even if the amount of the air which flows into the light source 61 is decreased in comparison with the conventional amount, the light source 61 can be cooled well. Thereby, it is possible to reduce the rotation speed (rpm) of the light source blower 91. Thus, a wind noise (kazekirion) of the light source blower 95 can be reduced. Furthermore, since the rotation speed (rpm) of the light source blower 95 can be reduced, the electrical power for the apparatus can be saved.

Figure 27:
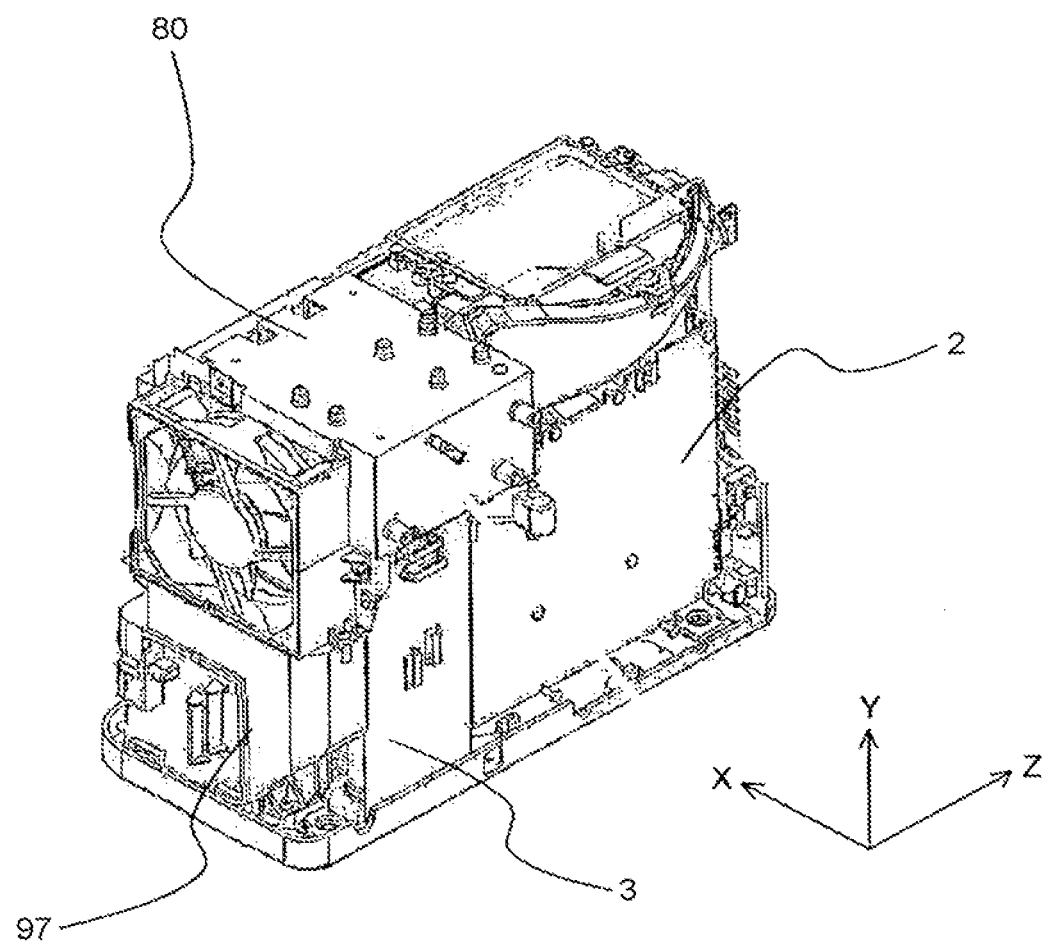
FIG. 27 is a perspective view illustrating a board to be mounted on the main body.

FIG. 27 perspectively illustrates a board to be arranged in the main body.

As illustrated in FIG. 27, the projector 1 according to the present embodiment is provided with a control board 2 as a control unit for controlling, for example, drive of the DMD 12, which is the image forming element, a ballast board unit 3 including the ballast board 3a (see FIG. 24) as an electrical power stabilizing unit for supplying a stabilized electrical power (current, voltage) to the light source 61, and the power source unit 80 including a PFC power source board as an electrical power source unit for boosting the AC voltage supplied from the power source cable and supplying the power to the control board 2 and the ballast board 3a.

Figure 28:
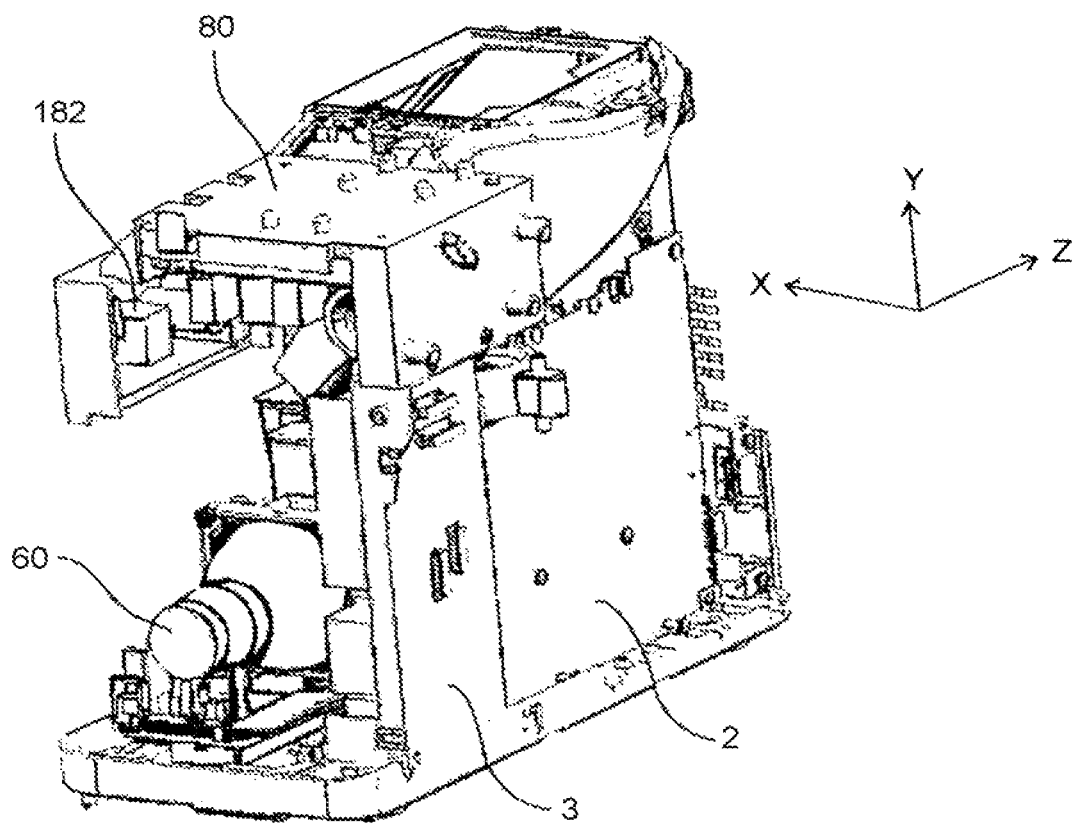
FIG. 28 is a perspective view illustrating a state that an exhaust fan and a light source housing are removed from the state illustrated in FIG. 27.

FIG. 28 perspectively illustrates a state that the exhaust fan 86 and the light source housing 97 are removed from the state illustrated in FIG. 27.

As illustrated in FIG. 28, the control board 2 is arranged to face the side surface (ZY plane) of the illumination unit 20 and the first optical unit 30. The ballast board unit 3 is arranged at a position adjacent to the control board 2 in the Z direction (horizontal direction), and adjacent to the light source unit 60 in the X direction (direction orthogonal to the projection image). The power source unit 80 is arranged on the upper side of the light source unit 60 and the ballast board unit 3. The power source unit 80 includes a thermal switch 182 for shielding the supply of voltage from the power source cable when its temperature becomes higher than or equal to a predetermined temperature.

Figure 29A:
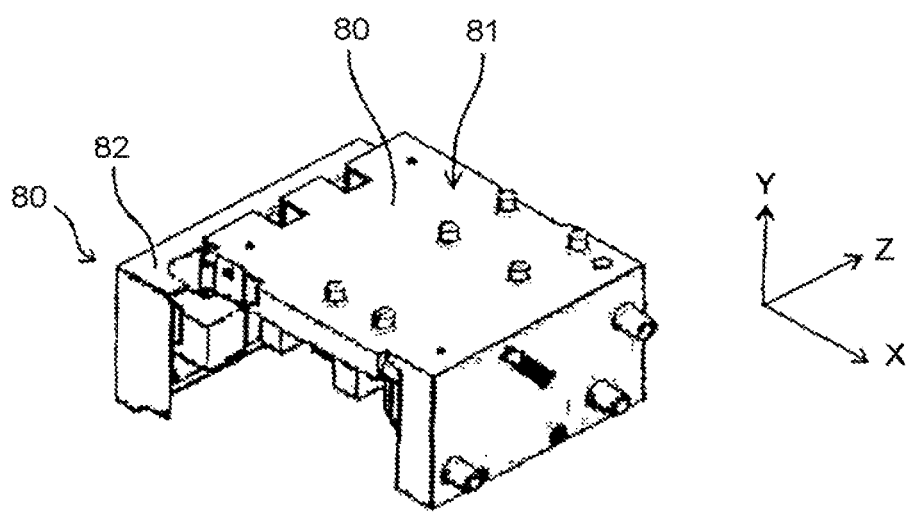
FIGS. 29A and 29B are perspective views illustrating a power source unit.
Figure 29B:
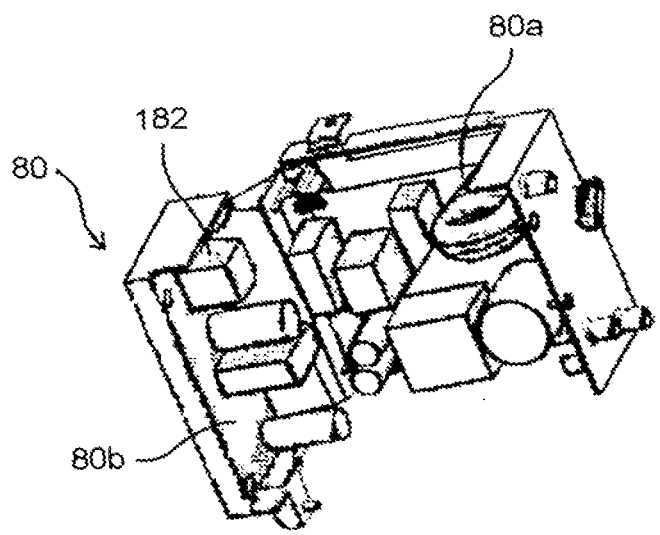

FIGS. 29A and 29B are perspective views illustrating the power source unit 80.

As illustrated in FIGS. 29A and 29B, and FIG. 23, the PFC power source board of the power source unit 80 is divided into the main PFC power source board 80a as a first power source board and the sub PFC power source board 80b as a second power source board. The main PFC power source board 80a is attached to a substantially L-shaped main board holder 81, and the sub PFC power source board 80b is attached to a sub board holder 82. The light source unit 60 and the light source 61 are arranged on a normal line of the main PFC power source board 80a.

The main board holder 81 includes a board attaching surface 81a to which the main PFC power source board 80a is attached on the lower surface, and a cover surface 81b extending downward from the near side end in the X direction in the figure of the board attaching surface 81a.

The sub board holder 82 is attached to the near side end in the X direction in the figure of the board attaching surface 81a so that the sub PFC power source board 80b faces the cover surface 81b. The thermal switch 182 is arranged on the sub PFC power source board 80b. As illustrated in FIG. 27, a plurality of boards configuring the power source unit 80, specifically, the main PFC power source board 80a and the sub PFC power source board 80b are attached to the main body so as to surround the air suction inlet of the exhaust fan 86 with the board attaching surface 81a of the main board holder 81, the cover surface 81b, and the sub board holder 82.

The main PFC power source board 80a, the sub PFC power source board 80b, and the cover surface 81b are arranged to form a flow path that surrounds the flow of air flowing towards the exhaust fan 86 by the intake of the exhaust fan 86 as the air blowing unit, that is, to form two surfaces of the flow path for guiding the air flowing towards the exhaust outlet 85 from different directions. The power source unit 80 may be configured by three boards to become three surfaces of the flow path. If the fluid guide 87 is arranged, the space partially surrounded by the main PFC power source board 80a and the sub PFC power source board is the flow path from the fluid guide 87 to the exhaust outlet 85. If the fluid guide 87 is not arranged, the space partially surrounded by the main PFC power source board 80a and the sub PFC power source board 80b is the flow path from the light source exhaust outlet 64c to the exhaust outlet 85. It also functions as a flow path of the air flowing from the air inlet 84 towards the exhaust outlet 85 via the back surface of the curved mirror 42. More specifically, the main PFC power source board 80a and the sub PFC power source board 80b are arranged to become two surfaces of a substantially quadratic column or a polygonal column connecting to the surface exhausting the air of the exhaust fan 86 so as to enable the movement of the air. Neither the main PFC power source board 80a nor the sub PFC power source board 80b is arranged on the surface closest to the light source unit 60 of the four surfaces of the substantially quadratic column so as not to inhibit the flow of air from the light source unit 60 towards the exhaust outlet 85. Moreover, neither the main PFC power source board 80a nor the sub PFC power source board 80b is arranged on the surface closest to the exterior cover on the opposite side of the projection surface of the surfaces of the substantially quadratic column, so that the flow of air flowing towards the exhaust outlet 85 along the back surface of the curved mirror 42 having a concave surface shape is not inhibited, and the speed of the flow of air flowing towards the exhaust outlet 85 along the back surface of the curved mirror 42 having a concave surface shape is not affected. Not arranging the main PFC power source board 80a and the sub PFC power source board 80b on the surface closest to the exterior cover on the opposite side of the projection surface of the surfaces of the substantially quadratic column means the same as not arranging the main PFC power source board 80a and the sub PFC power source board 80b on the cover surface 81b of the power source unit 60. The curved mirror 42 is a concave mirror having a positive power, as described above, and the back surface of the concave mirror 42 has a convex shape almost along the concave shape of the front surface. The flow path formed by the main PFC power source board 80a and the sub PFC power source board 80b is fluidically connected with the flow path (second flow path) formed by the back surface of the curved mirror 42 and the exterior cover 59 facing the back surface of the curved mirror 42. Incidentally, "fluidically connected" herein means that the air can continuously flow through the "fluidically connected" flow paths. Thereby, the air taken from the air inlet 84 at the side surface of the exterior cover 59 and flowed towards the exhaust outlet 85 along the back surface of the concave mirror 42 is exhausted from the exhaust outlet 85 by the exhaust fan 86 through a space surrounded by the sub PFC power source board 80b, the main PFC power source board 80a, and the cover surface 81b. Thus, although the main PFC power source board 80a and the sub PFC power source board 80b are heated by the light source unit 60 and the fluid guide 87, they are cooled by the air flowing towards the exhaust outlet 85 along the back surface of the concave mirror 42, so that the temperature rise of the main PFC power source board 80a and the sub PFC power source board 80b can be suppressed. Moreover, the apparatus can be downsized by arranging the power source unit 80 in a space that could not be conventionally used as a place to arrange the power source unit 80 due to the problem of waste heat from the light source 61.

When the main PFC power source board 80a and the sub PFC power source board 80b are aligned in the air flowing direction, the PFC power source board arranged on the downstream side of the air flowing direction is cooled by the air heated by the PFC power source board on the upstream side, and thus the PFC power source board on the downstream side is not sufficiently cooled. However, the main PFC power source board 80a and the sub PFC power source board 80b can be cooled with low temperature air by arranging the main PFC power source board 80a and the sub PFC power source board 80b so as to surround the airflow from the air inlet 84 toward the exhaust outlet 85. The main PFC power source board 80a and the sub PFC power source board 80b, that is, the entire PFC power source boards thus can be satisfactorily cooled even in the area subjected to the influence of high temperature air exhaust from the light source unit 60.

The air suction inlet of the exhaust fan 86 is surrounded by a surface of the main PFC power source board 80a on which electrical elements such as a coil, a capacitor and a resistor are arranged, a surface of the sub PFC power source board 80b on which such electrical elements are arranged, and the cover surface 81b. Thereby, the low temperature air taken from the air inlet 84 can be brought into contact with the electrical elements such as the coil and the capacitor that generate heat, and the PFC power source boards can be efficiently cooled.

In the present embodiment, since the sub PFC power source board 80b is disposed orthogonal to the surface of the main PFC power source board 80a, the apparatus can be downsized compared to when the main PFC power source board 80a and the sub PFC power source board 80b are arranged side by side such that the main PFC power source board 80a surface and the sub PFC power source board surface are parallel.

In the above description, the power source unit 80 has a shape that causes the sub PFC power source board to face the cover surface 81b. However, another arrangement is possible so that the sub PFC power source board 80b faces the main PFC power source board 80a. With this arrangement as well, the main PFC power source board 80a and the sub PFC power source board 80b can surround the flow path of the air, and the entire PFC power source boards can be satisfactorily cooled. A great number of electrical elements such as coils extending in the direction orthogonal to the board surface are attached to the main PFC power source board 80a and the sub PFC power source board 80b. Thus, when the sub PFC power source board 80b is arranged to face the main PFC power source board 80a, the electrical elements on the main PFC power source board 80a and the electrical elements on the sub PFC power source board 80b are arranged to be one over the other with respect to a direction of the airflow toward the exhaust fan 86. As a result, the air flowing toward the exhaust fan 86 may hit electrical elements, and the airflow in the space surrounded by the main PFC power source board 80a and the sub PFC power source board 80b may be hindered. On the other hand, when the sub PFC power source board 80b is arranged to be orthogonal to the main PFC power source board 80a, the air can flow to the exhaust fan 86 without hitting the electrical elements at least in a lower area near the cover surface 81b (an area apart from the main PFC power source board 80a) in the space surrounded by the main PFC power source board 80a, the sub PFC power source board, and the cover surface 81b. Therefore, the airflow in the space surrounded by the main PFC power source board 80a, the sub PFC power source board 80b, and the cover surface 81b can be improved so that effective and efficient cooling can be carried out compared to when the sub PFC power source board 80b is arranged to face the main PFC power source board 80a.

FIGS. 30A and 30B perspectively illustrate the ballast board unit 3.

As illustrated in FIGS. 30A and 30B, the ballast board unit 3 includes a ballast board holder 3b for holding the ballast board 3a. Ventilation holes 3c are provided on the bottom surface of the ballast board holder 3b.

Figure 31:
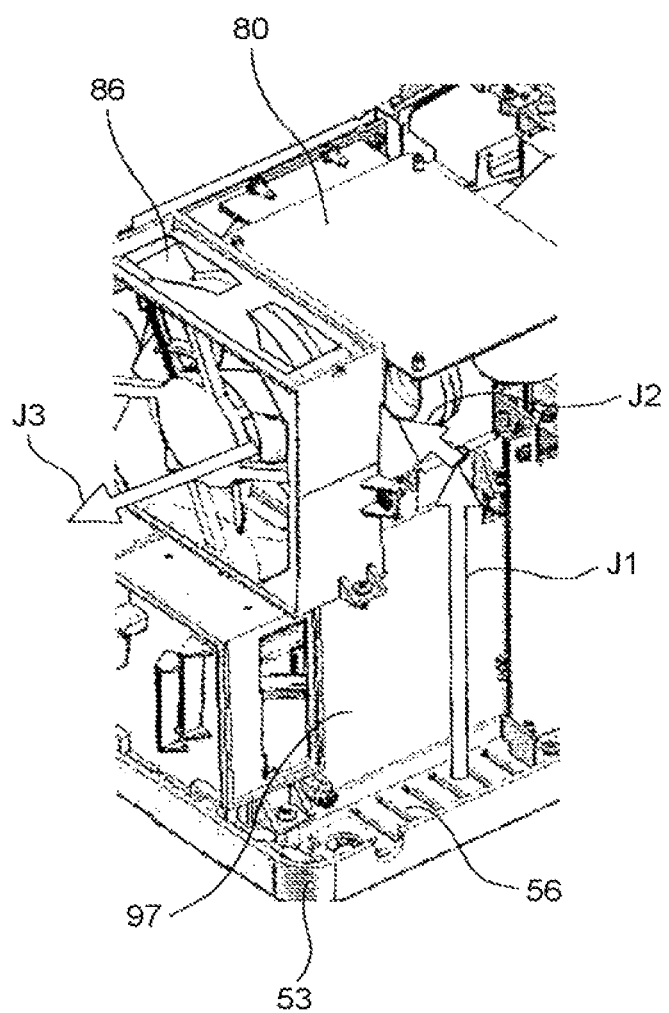
FIG. 31 is a perspective view illustrating a state that the ballast board unit is removed from the main body.

FIG. 31 perspectively illustrates a state that the ballast board unit 3 is removed from the main body.

As illustrated in FIG. 31, the power source air inlets 56 are arranged at a part of the base member 53 beneath an area where the ballast board unit 3 is to be mounted. The ballast board unit 3 is attached to the main body so that the ventilation holes 3c of the ballast board holder face the power source air inlets 56 and the ballast board 3a faces the light source housing 97.

The air suctioned by the suction force of the exhaust fan 86 from the power source air inlets 56 rises between the light source housing 97 and the ballast board 3a, as indicated by an arrow J1 in FIG. 31. Thereby, the light source housing 97 and the ballast board 3a can be cooled. Furthermore, as indicated by an arrow J2 in FIG. 31, the air flows into the space surrounded by the main PFC power source board 80a, the cover surface 81b, and the sub PFC power source board 80b. After cooling the PFC power source boards 80a and 80b, the air is then discharged to the outside of the apparatus from the exhaust fan 86, as indicated by an arrow J3 in FIG. 31.

Therefore, in the present embodiment, the ballast board 3a and the PFC power source boards 80a, 80b can be efficiently cooled, since the air for cooling the ballast board 3a is flowed to the space surrounded by the main PFC power source board 80a, the cover surface 81b, and the sub PFC power source board 80b to also cool the PFC power source boards 80a, 80b.

Figure 32:
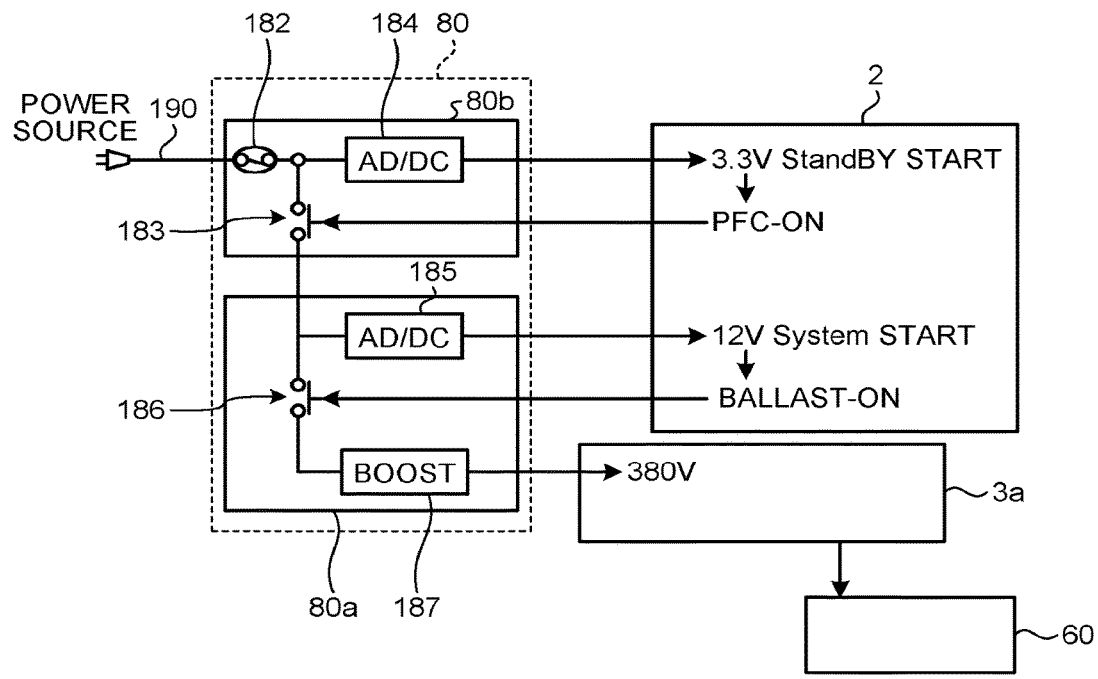
FIG. 32 is a block diagram illustrating power supply.

FIG. 32 is a block diagram illustrating power supply.

As illustrated in FIG. 32, the sub PFC power source board 80b includes a PFC switch unit 183 and a starting voltage converter 184 for converting the AC voltage supplied from a power source cable 190 to the DC voltage and supplying the DC voltage of 3.3V to the control board 2.

The main PFC power source board 80a includes a control voltage converter 185 for converting the AC voltage supplied from the power source cable 190 to the DC voltage and supplying the DC voltage of 12 V to the control board 2, a ballast switch unit 186, and a booster 187 for boosting the AC voltage of 100 V to 380 V. In the present embodiment, the power source unit 80 is configured by a plurality of boards, as illustrated in FIG. 32. However, the same effect can be obtained even if the ballast board 3*a*, which is the power stabilizing unit for stabilizing the power to the light source 61, is divided into a plurality of boards. One of the divided ballast boards 3*a* and the main PFC power source board 80*a* may form the two surfaces of the flow path.

When a plug of the power source cable 190 is inserted to an outlet or socket and the AC voltage is applied to the sub PFC power source board 80*b*, the DC voltage of 3.3 V is applied from the starting voltage converter 184 to the control board 2. When the DC voltage of 3.3 V is applied, the control board 2 turns ON the PFC switch unit 183 of the sub PFC power source board 80*b* after determining that the apparatus is in a normal state by examining for example the temperature detected with a temperature detection unit such as a thermistor arranged at a predetermined position of the apparatus and the like.

When the PFC switch unit 183 is turned ON, the AC voltage from the power source cable 190 is supplied to the main PFC power source board 80*a*. When the AC voltage is supplied to the main PFC power source board 80*a*, the DC voltage of 12 V is applied from the control voltage converter 185 to the control board 12 V. When the DC voltage of 12 V is applied, the control board 2 turns ON the ballast switch unit 186 of the main PFC power source board 80*a* if the light source 61 and the like are not found to be abnormal as a result of checking for example the temperature of the light source 61 and the like.

When the ballast switch unit 186 of the main PFC power source board 80*a* is turned ON, the AC voltage from the power source cable 190 is applied to the booster 187, the AC voltage is boosted to 380 V in the booster 187, and the voltage of 380 V is applied to the light source 61 while controlling such that a stabilized power (current) is supplied to the light source 61 by the ballast board 3*a*. The light source is thereby lighted.

The above explanations are only examples. The present invention has specific effects for each of the following aspects (1) to (8) including embodiments.

(1)

An image projection apparatus is provided with a light source, light from which is used to form an image to be projected, a first flow path, a control unit configured to control a light emission from the light source, an electrical power stabilizing unit configured to stabilize an electrical power to be supplied to the light source, and an electrical power source unit configured to supply the electrical power to at least one of the control unit and the electrical power stabilizing unit. One or both of the electrical power source unit and the electrical power stabilizing unit is/are divided into a plurality of boards. The light source is arranged on a normal line of a surface of any of the plurality of boards (the sub PFC power source board 80*b* in the present embodiment). The plurality of boards configure surfaces of the first flow path except a surface nearest to the light source.

According to the configuration as such, components to form only the flow path are not required. Thus, the number of components can be reduced. The boards relating to electrical power source can be accommodated in a small space. Thereby, the apparatus can be downsized, since there is no need for preparing a large space for accommodating boards relating to electrical power source, and a space which has been conventionally a dead space can be efficiently used.

(2)

The image projection apparatus described in (1) is provided with a case configured to accommodate the light source, a projection optical part including a reflecting surface to form a projection image of the image formed by using the light from the light source, and the plurality of boards. A second flow path is formed at least by one side surface of the case and a back surface of the reflecting surface. The second flow path is fluidically connected with the first flow path. None of the plurality of boards configures a surface of the first flow path near the one side surface of the case.

According to the configuration as such, the airflow from the air inlet 84 to the exhaust outlet 85 is not hindered by the boards.

(3)

In the image projection apparatus described in (1) or (2), the plurality of boards are arranged so that their surfaces on which one or more electrical elements is/are disposed face inward of the first flow path.

According to the configuration as such, electrical elements including coil, capacitor and the like which generate heat on the boards can be cooled directly by the air. Thus, entire electrical power source boards can be efficiently and effectively cooled.

(4)

In the image projection apparatus described in any of (1) to (3), one of the plurality of boards (the sub PFC power source board 80*b* in the present embodiment) has a thermal switch 182 to shut off the electrical power to be supplied to the plurality of boards, when it becomes a predetermined temperature or more. The power source board provided with the power switch 182 is disposed above the light source 61.

According to the configuration as such, the following effect can be obtained. The air around the light source 61 is heated because of the heat radiation from the light source 61 when the light source 61 becomes abnormally high temperature. The heated air rises upward to heat the thermal switch 182. As a result, the thermal switch 182 becomes the predetermined temperature or more, and shuts off the electrical power to be supplied to the power source boards. Thereby, the light source 61 can be prevented from being continuously used while it becomes abnormally high temperature. Thus, the safety of the image projection apparatus can be more improved.

According to the present invention, it is possible to use efficiently the space to which heat is likely to be conducted and/or radiated from the light source.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus comprising:
  an outer cover;
  a light source;
  a board having a surface on which one or more electrical elements are mounted;
  an exhaust outlet at the outer cover of the image projection apparatus with at least a part of the exhaust outlet disposed above the light source; and
  an air inlet at the outer cover and below the board, wherein the light source and the board are side-by-side in a short-side direction of a bottom surface of the image projection apparatus, the surface of the board on which the one or more electrical elements are mounted faces the light source.

2. The image projection apparatus according to claim 1, wherein a length of the bottom surface in the short-side direction is shorter than a height of the image projection apparatus.

3. The image projection apparatus according to claim 2, wherein the exhaust outlet is disposed on a side surface of the outer cover, the side surface being connected to a short side of the bottom surface.

4. The image projection apparatus according to claim 1, wherein the air inlet is disposed on the bottom surface and under the board.

5. The image projection apparatus according to claim 3, wherein the air inlet is disposed on the bottom surface of the image projection apparatus and under the board.

6. The image projection apparatus according to claim 5, wherein the short-side direction of the bottom surface is parallel to a direction perpendicular to a projection image.

7. The image projection apparatus according to claim 1, wherein the short-side direction of the bottom surface is parallel to a direction perpendicular to a projection image.

8. The image projection apparatus according to claim 1, further comprising:

a fan at the exhaust outlet and above the light source.

9. The image projection apparatus according to claim 1, wherein the board includes a ballast circuit for controlling the light source.

10. The image projection apparatus according to 1, wherein air taken from the air inlet flows upward between the board and the light source.

* * * * *